US012567002B2

(12) United States Patent
Mori et al.

(10) Patent No.: US 12,567,002 B2
(45) Date of Patent: Mar. 3, 2026

(54) SIMILARITY DEGREE CALCULATION DEVICE, SIMILARITY DEGREE CALCULATION METHOD, AND NON-TRANSITORY COMPUTER-READABLE RECORDING MEDIUM

(71) Applicant: Mitsubishi Electric Corporation, Tokyo (JP)

(72) Inventors: Ikumi Mori, Tokyo (JP); Genya Itagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 552 days.

(21) Appl. No.: 18/129,240

(22) Filed: Mar. 31, 2023

(65) Prior Publication Data

US 2023/0237379 A1 Jul. 27, 2023

Related U.S. Application Data

(63) Continuation of application No. PCT/JP2020/046743, filed on Dec. 15, 2020.

(51) Int. Cl.
G06F 16/00 (2019.01)
G06N 3/096 (2023.01)
G06N 20/00 (2019.01)

(52) U.S. Cl.
CPC ............. *G06N 20/00* (2019.01); *G06N 3/096* (2023.01)

(58) Field of Classification Search
None
See application file for complete search history.

(56) References Cited

U.S. PATENT DOCUMENTS 5,390,259 A * 2/1995 Withgott ................ G06V 30/40
382/173
2003/0202692 A1 10/2003 Obrador
(Continued)

FOREIGN PATENT DOCUMENTS

JP 2005-44033 A 2/2005
JP 2015-7919 A 1/2015
(Continued)

OTHER PUBLICATIONS

Zhong, Xiaofeng, et al. "Feature-based transfer learning based on distribution similarity." (2018) IEEE Access 6: 35551-35557. (Year: 2018).*

(Continued)

*Primary Examiner* — Polina G Peach
(74) *Attorney, Agent, or Firm* — Birch, Stewart, Kolasch & Birch, LLP

(57) ABSTRACT

A similarity degree calculation device (1) includes a similarity degree calculation unit (19) and performs transfer learning with using a transfer source data candidate (2) and transfer destination data (3). The similarity degree calculation unit (19) finds a similarity degree between a transfer source data distribution and a transfer destination data distribution on a basis of a transfer source extremal value group and a transfer destination extremal value group. The transfer source extremal value group includes a transfer source extremal value indicating an extremal value of the transfer source data distribution indicating a distribution of a feature amount of the transfer source data candidate (2). The transfer destination extremal value group includes a transfer destination extremal value indicating an extremal value of the transfer destination data distribution indicating a distribution of a feature amount of the transfer destination data (3).

14 Claims, 19 Drawing Sheets

(56) References Cited

U.S. PATENT DOCUMENTS

| | | | | |
|---|---|---|---|---|
| 2007/0143284 | A1* | 6/2007 | Lee | G06F 40/44 |
| | | | | 707/999.005 |
| 2011/0069896 | A1* | 3/2011 | Ishiga | G06F 16/51 |
| | | | | 382/224 |
| 2011/0081089 | A1* | 4/2011 | Mori | G06V 40/171 |
| | | | | 382/218 |
| 2011/0222372 | A1* | 9/2011 | O'Donovan | G01S 3/8083 |
| | | | | 367/103 |
| 2011/0311129 | A1* | 12/2011 | Milanfar | G06V 10/50 |
| | | | | 382/154 |
| 2012/0045095 | A1* | 2/2012 | Tate | G06T 5/73 |
| | | | | 382/103 |
| 2013/0325471 | A1* | 12/2013 | Rachevsky | G06F 18/2411 |
| | | | | 704/244 |
| 2014/0348423 | A1* | 11/2014 | Ishiga | G06V 20/35 |
| | | | | 382/165 |
| 2016/0012280 | A1* | 1/2016 | Ito | G06V 40/173 |
| | | | | 382/305 |
| 2016/0155235 | A1 | 6/2016 | Miyatani et al. | |
| 2018/0349633 | A1 | 12/2018 | Takimoto | |
| 2019/0080209 | A1* | 3/2019 | Reeves | G06N 20/10 |
| 2019/0130216 | A1 | 5/2019 | Tomioka et al. | |
| 2019/0220977 | A1* | 7/2019 | Zhou | G06N 3/09 |
| 2019/0354850 | A1* | 11/2019 | Watson | G06N 5/02 |
| 2021/0281748 | A1 | 9/2021 | Nogami et al. | |
| 2021/0406601 | A1* | 12/2021 | Narlikar | G06F 16/55 |
| 2022/0027339 | A1* | 1/2022 | Haim | G06F 16/2282 |
| 2022/0092037 | A1* | 3/2022 | Alvarez-Melis | G06N 7/01 |
| 2023/0229897 | A1* | 7/2023 | Komkov | G06N 3/0499 |
| | | | | 382/155 |

FOREIGN PATENT DOCUMENTS

| | | |
|---|---|---|
| JP | 2015-225453 A | 12/2015 |
| JP | 2016-9391 A | 1/2016 |
| JP | 2016-103084 A | 6/2016 |
| JP | 2016-103230 A | 6/2016 |
| JP | 2017-11523 A | 1/2017 |
| JP | 2017-111654 A | 6/2017 |
| JP | 2017-142739 A | 8/2017 |
| JP | 2019-28532 A | 2/2019 |
| JP | 2019-86979 A | 6/2019 |
| JP | 2019-87229 A | 6/2019 |
| JP | 2019-191923 A | 10/2019 |
| JP | 2020-96325 A | 6/2020 |
| WO | WO 2014/092193 A1 | 6/2014 |

OTHER PUBLICATIONS

Weiss, Karl, Taghi M. Khoshgoftaar, and DingDing Wang. "A survey of transfer learning." (2016) Journal of Big data 3.1 (Year: 2016).*

Alothman et al., "Class Balanced Similarity-Based Instance Transfer Learning for Botnet Family Classification," International Conference on Discovery Science, Lecture Notes in Computer Science, vol. 11198, 2018, pp. 99-113.

Extended European Search Report for European Application No. 20965886.3, dated Dec. 8, 2023.

Li et al., "Human Motion Recognition With Limited Radar Micro-Doppler Signatures," IEEE Transactions on Geoscience and Remote Sensing, vol. 59, No. 8, Oct. 13, 2020, 23 pages total.

European Office Action for European Application No. 20 965 886.3, dated Nov. 21, 2024.

Chinese Office Action and Search Report for Chinese Application No. 202080107686.8, dated Mar. 26, 2025, with English translation.

Csurka et al., "Visual Categorization with Bags of Keypoints", ECCV (European Conference on Computer Vision) International Workshop on Statistical Learning in Computer Vision, pp. 1-22 (2004).

Dalal et al., "Histograms of Oriented Gradients for Human Detection", 2005 IEEE (Institute of Electrical and Electronics Engineers) Computer Society Conference on Computer Vision and Pattern Recognition (CVPR '05), vol. 1, pp. 886-893, doi: 10.1109/CVPR. 2005.177 (2005).

International Search Report for PCT/JP2020/046743 (PCT/ISA/210) mailed on Mar. 16, 2021.

Lowe, "Distinctive Image Features from Scale-Invariant Keypoints", Int. J. Comput. Vision, vol. 60, No. 2, pp. 91-110 (2004).

* cited by examiner

$$G^{s1} = \{(x_1^{s1}, y_1^{s1}), (x_2^{s1}, y_2^{s1}), (x_3^{s1}, y_3^{s1})\}$$
$$G^{s2} = \{(x_1^{s2}, y_1^{s2})\}$$
$$\vdots$$
$$G^{sn} = \{(x_1^{sn}, y_1^{sn}), (x_2^{sn}, y_2^{sn}), (x_3^{sn}, y_3^{sn})\}$$
$$\vdots$$

$G^s$

DATASET STORAGE UNIT

| NAME OF DATASET | ELEMENT |
|---|---|
| DATASET 105-1 | $((x_1^{s2}, y_1^{s2}), c^{s2}),\ \ldots$ |
| DATASET 105-2 | $\vdots$ |
| DATASET 105-3 | $((x_1^{s1}, y_1^{s1}), c^{s1}),\ ((x_2^{s1}, y_2^{s1}), c^{s1}),\ ((x_3^{s1}, y_3^{s1}), c^{s1}),\ \ldots,$ <br> $((x_1^{sn}, y_1^{sn}), c^{sn}),\ ((x_2^{sn}, y_2^{sn}), c^{sn}),\ ((x_3^{sn}, y_3^{sn}), c^{sn}),\ \ldots$ |
| ... | $\vdots$ |
| DATASET 105-N | $\vdots$ |

START

REPETITION AS MANY TIMES AS NUMBER OF TRANSFER SOURCE DATA CANDIDATES 2

FEATURE EXTRACTION PROCESS — S101

DATA DISTRIBUTION COMPUTATION PROCESS — S102

EXTREMAL VALUE COMPUTATION PROCESS — S103

GROUPING PROCESS — S104

MODEL CREATION PROCESS — S105

END

START

S111 FEATURE EXTRACTION PROCESS

S112 DATA DISTRIBUTION COMPUTATION PROCESS

S113 EXTREMAL VALUE COMPUTATION PROCESS

S114 MODEL DETERMINATION PROCESS

S115 SIMILARITY DEGREE CALCULATION PROCESS

S116 DATA DETERMINATION PROCESS

END

SIMILARITY DEGREE CALCULATION DEVICE

1

58

PROCESSING CIRCUIT

59

54

INPUT/OUTPUT IF

55

COMMUNICATION DEVICE

Fig. 15

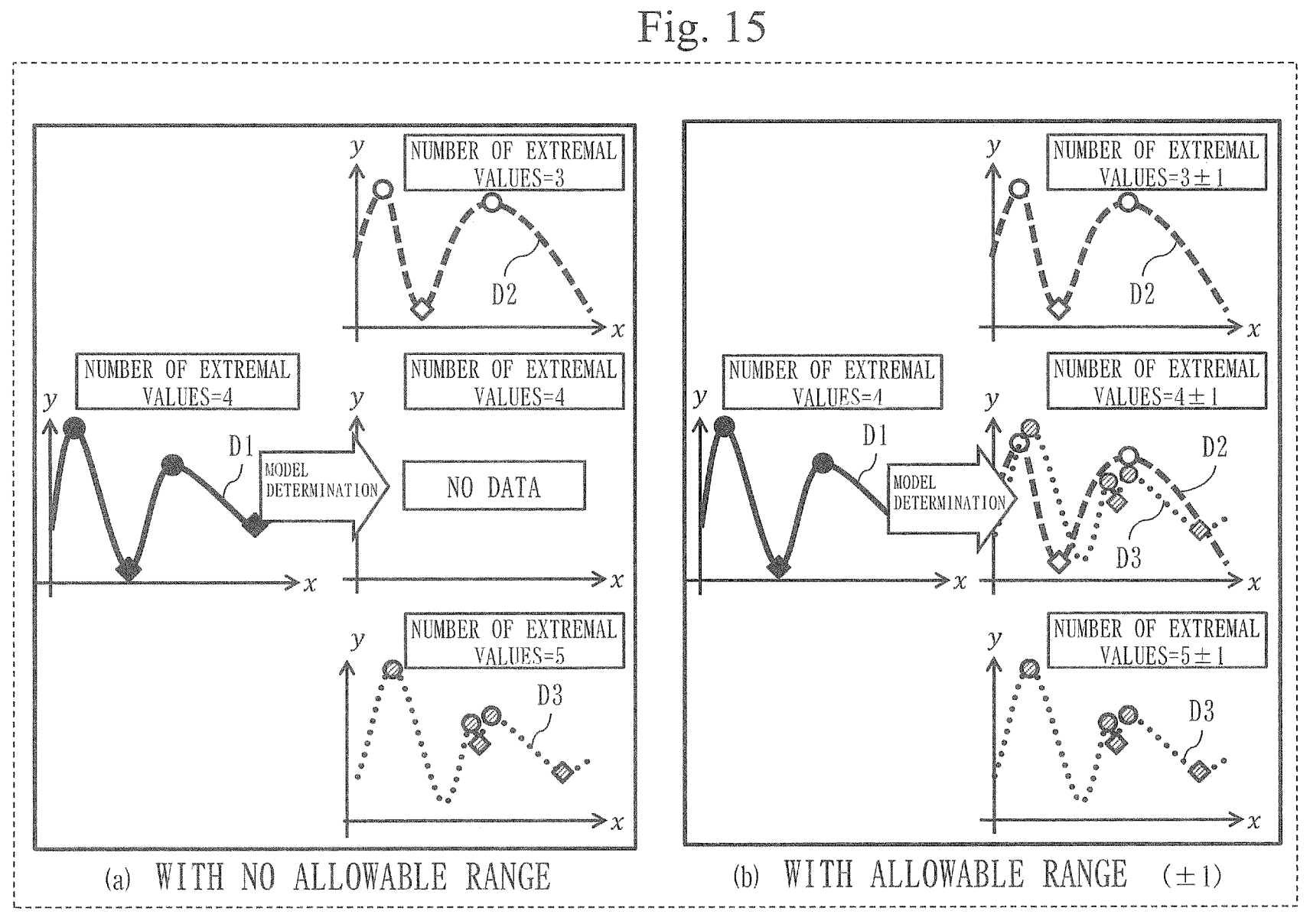

NUMBER OF EXTREMAL VALUES=3

NUMBER OF EXTREMAL VALUES=4

NO DATA

NUMBER OF EXTREMAL VALUES=5

NUMBER OF EXTREMAL VALUES=4

MODEL DETERMINATION (a) WITH NO ALLOWABLE RANGE

NUMBER OF EXTREMAL VALUES=3±1

NUMBER OF EXTREMAL VALUES=4±1

NUMBER OF EXTREMAL VALUES=5±1

NUMBER OF EXTREMAL VALUES=4

MODEL DETERMINATION (b) WITH ALLOWABLE RANGE (±1)

Fig. 17

SIMILARITY DEGREE CALCULATION DEVICE, SIMILARITY DEGREE CALCULATION METHOD, AND NON-TRANSITORY COMPUTER-READABLE RECORDING MEDIUM

CROSS REFERENCE TO RELATED APPLICATION

This application is a Continuation of PCT International Application No. PCT/JP2020/046743, filed on Dec. 15, 2020, which is hereby expressly incorporated by reference into the present application.

TECHNICAL FIELD

The present disclosure relates to a similarity degree calculation device, a similarity degree calculation method, and a similarity degree calculation program.

BACKGROUND ART

In Internet of Things (IoT) equipment, solutions that utilize artificial intelligence (AI) increase. Specific examples are: (1) control of IoT home appliances such as air-conditioners and illuminations; (2) fault diagnosis of manufacturing devices; (3) inspection of products in a manufacture line on a basis of images; (4) intrusion detection of a suspicious person into a building or the like on a basis of video taken on entering: and (5) an energy management system (EMS).

When AI is used per IoT equipment, it is often difficult to secure a sufficient number of pieces of training data to be used for learning processing. Accordingly, learning processing must be performed efficiently using a small amount of training data. As a method of learning using a small amount of training data, there is a method called transfer learning. In transfer learning, training data and a learning model in an environment different from an environment where the training data was collected are transferred.

In transfer learning, in order to identify a transfer source, all pieces of data as transfer source candidates are evaluated one by one as to whether or not they can be each a transfer source. If it can be confirmed by evaluation that transfer of a transfer source candidate is "positive transfer" indicating that the transfer is effective, the transfer source candidate is determined as the transfer source. If the training data is image data, often, the image of the transfer source candidate being sufficiently similar to an image of a transfer destination is a sufficient condition for "positive transfer".

Patent Document 1 discloses: a method of finding a similarity degree by calculating a color histogram of each image; a method of finding a similarity degree by taking a gradient direction of luminance as a feature amount; a method that uses, as an evaluation value, a number of local features with feature amounts that are similar between local features detected from an input image and local features detected from a learning image; and so on, which are each a method of computing a similarity degree between a search target image and a search source image with using some kind of evaluation function, as a method of calculating a similarity of images.

CITATION LIST

Patent Literature

Patent Literature 1: JP 2019-087229 A

SUMMARY OF INVENTION

Technical Problem

The methods disclosed in Patent Literature 1 includes a problem that a computation complexity is relatively large.

An objective of the present disclosure is to find, in transfer learning, a transfer source with a relatively small computation complexity.

Solution to Problem

A similarity degree calculation device according to the present disclosure is a similarity degree calculation device which performs transfer learning with using a transfer source data candidate and transfer destination data, and includes:

a similarity degree calculation unit to find a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data.

Advantageous Effects of Invention

According to the present disclosure, it is possible to find, in transfer learning, a transfer source with a relatively small computation complexity.

BRIEF DESCRIPTION OF DRAWINGS

FIG. 2 is a specific example of feature data distribution 102S according to Embodiment 1.

FIG. 3 is a specific example of datasets 105 according to Embodiment 1.

FIG. 4 is a hardware configuration example of the similarity degree calculation device 1 according to Embodiment 1.

FIG. 9 is a diagram explaining the operations of the similarity degree calculation device 1 according to Embodiment 1.

FIG. 10 is a hardware configuration example of a similarity degree calculation device 1 according to a modification of Embodiment 1.

FIG. 15 includes diagrams explaining an overview of operations of a similarity degree calculation device 1 according to Embodiment 3, in which: (a) is a diagram explaining a case with no allowable range; and (b) is a diagram explaining a case with an allowable range.

FIG. 17 is a diagram explaining the operations of the similarity degree calculation device 1 according to Embodiment 3.

DESCRIPTION OF EMBODIMENTS

Figure 1:
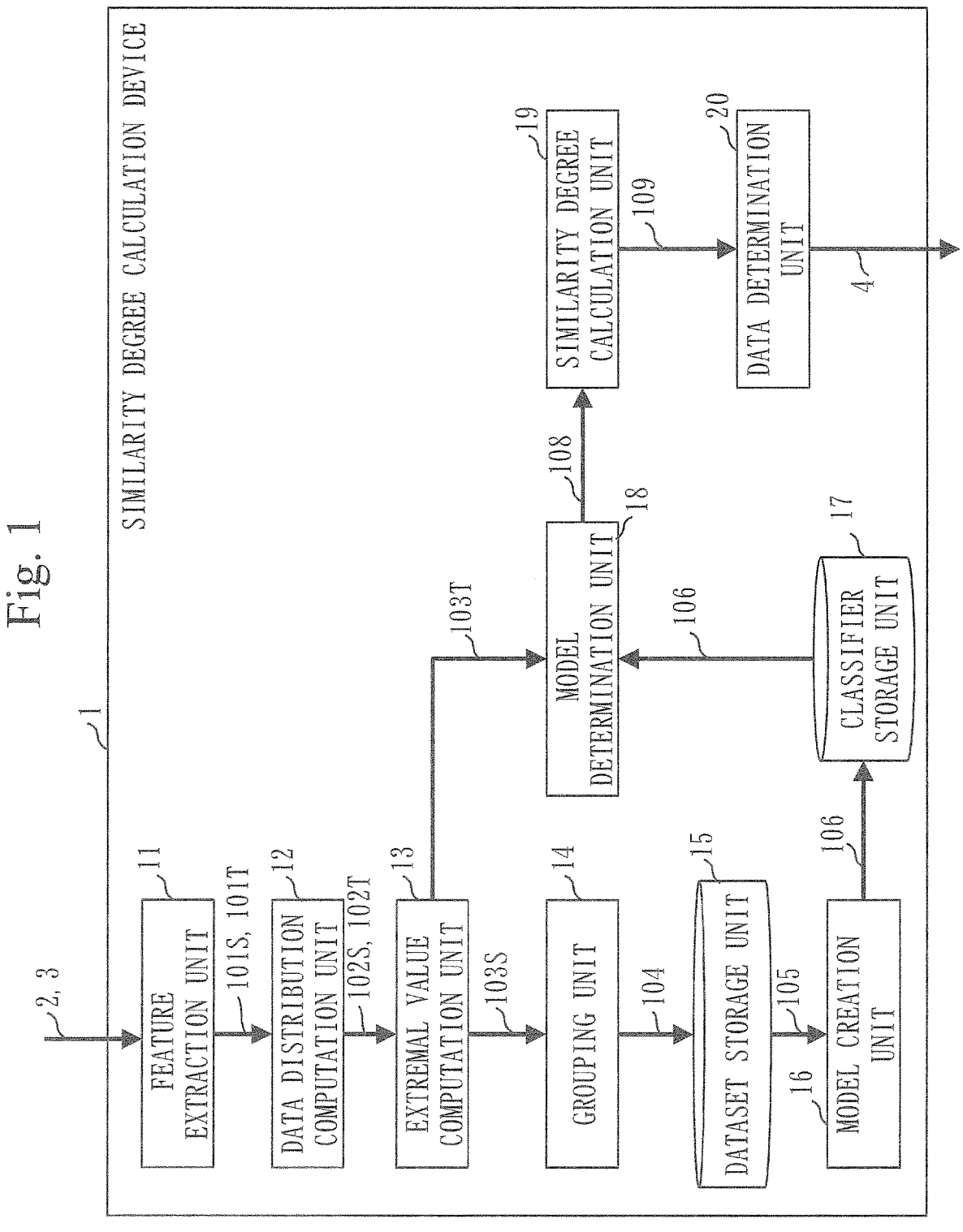
FIG. 1 is a configuration example of a similarity degree calculation device 1 according to Embodiment 1.

In descriptions and drawings of embodiments, the same elements or equivalent elements are denoted by the same reference sign. Description of an element denoted by the same reference sign will be appropriately omitted or simplified. Arrows in the drawings mainly illustrate data flows or process flows. A term "unit" may be appropriately replaced by "circuit", "stage", "procedure", "process", or "circuitry".

Embodiment 1

The present embodiment will be described in detail with referring to drawings.

Description of Configuration

FIG. 1 illustrates a configuration example of a similarity degree calculation device 1 according to the present embodiment. As illustrated in FIG. 1, the similarity degree calculation device 1 is provided with a feature extraction unit 11, a data distribution computation unit 12, an extremal value computation unit 13, a grouping unit 14, a dataset storage unit 15, a model creation unit 16, a classifier storage unit 17, a model determination unit 18, a similarity degree calculation unit 19, and a data determination unit 20.

The similarity degree calculation device 1 performs transfer learning with using a transfer source data candidate 2 and transfer destination data 3. A letter T at an end of a reference sign and a superscript t of a reference sign indicate that the reference sign concerns a transfer destination data distribution. A letter S at an end of a reference sign and a superscript s of a reference sign indicate that the reference sign concerns a transfer source data distribution.

The feature extraction unit 11 generates a feature vector 101S indicating a feature amount of the transfer source data candidate 2 with using the transfer source data candidate 2, and generates a feature vector 101T indicating a feature amount of the transfer destination data 3 with using the transfer destination data 3. Each of the transfer source data candidate 2 and the transfer destination data 3 may be data received from another device, or may be data stored in the similarity degree calculation device 1. The transfer source data candidate 2 is a candidate for transfer source data. There is at least one transfer source data candidate 2. Assume that there is one piece of transfer destination data 3. A data format of the feature amount generated by the feature extraction unit 11 need not be a vector format. Assume that the feature vector 101S and the feature vector 101T are collectively referred to as a feature vector 101. A specific example of the feature vector 101 is an array of pixel values.

In a specific example, the feature extraction unit 11 finds, as the feature amount, at least one of: data summarized from the transfer source data candidate 2 or the transfer destination data 3 by principal component analysis; a statistic such as average, variance, and a correlation coefficient which concern the transfer source data candidate 2 or the transfer destination data 3; a value transformed from the transfer source data candidate 2 or the transfer destination data 3 with using histogram or (isogeny) mapping such as Fourier transform; and a gradient vector which is a coefficient or a variation obtained by performing function approximation of the transfer source data candidate 2 or the transfer destination data 3 with using regression analysis or the like. The term histogram may also refer to data that can be expressed by histogram. Assume that the feature amount to be found by the feature extraction unit 11 sufficiently reflects a feature of the transfer source data candidate 2 or the transfer destination data 3.

The data distribution computation unit 12 generates feature data distribution 102S with using the feature vector 101S, and generates a feature data distribution 102T with using the feature vector 101T. The feature data distribution 102S indicates a distribution of the feature amount of the transfer source data candidate 2, and is called transfer source distribution as well. There is at least one feature data distribution 102S. The transfer source data candidate 2 corresponds to feature data distributions 102S by one-to-one correspondence. The feature data distribution 102T indicates a distribution of the feature amount of the transfer destination data 3, and is called transfer destination distribution as well. Assume that the feature data distribution 102S and the feature data distribution 102T are collectively referred to as a feature data distribution 102. The feature data distribution 102 is typically a function, but may be a discrete distribution or continuous distribution.

The extremal value computation unit 13 finds extremal value data 103S with using the feature data distribution 102S. The extremal value data 103S consists of data $\mathrm{ID}^s$ (ID=Identification), an extremal value coordinate group $\mathrm{G}^s$, and a number $\mathrm{E}^s$ of extremal values, and is also called a computation result. The data $ID^s$ is an identifier to identify the transfer source data candidate 2, and is also called a transfer source data ID. The extremal value coordinate group $G^s$ is a set consisting of coordinates of extremal values of the feature data distribution 102S, and is also called a transfer source extremal value coordinate group or a transfer source extremal value group. There is at least one extremal value coordinate group $G^s$. The feature data distribution 102S corresponds to the extremal value coordinate group $G^s$ by one-to-one correspondence. Each extremal value included in the extremal value coordinate group $G^s$ is called a transfer source extremal value as well. Each transfer source extremal value is associated with an identifier that identifies a transfer source data candidate 2 corresponding to a feature data distribution 102S having an extremal value corresponding to that each transfer source extremal value. The number $E^s$ of extremal values is a number of extremal values included in the extremal value coordinate group $G^s$.

The extremal value computation unit 13 finds extremal value data 103T with using the feature data distribution 102T. The extremal value data 103T consists of an extremal value coordinate group $G^t$ and a number $E^t$ of extremal values, and is also called a computation result. The extremal value coordinate group $G^t$ is a set consisting of coordinates of extremal values of the feature data distribution 102T, and is also called a transfer destination extremal value coordinate group or a transfer destination extremal value group. The number $E^t$ of extremal values is a number of extremal values included in the extremal value coordinate group $G^t$. The extremal value data 103T may include an identifier that identifies the transfer destination data 3. Assume that the number $E^s$ of extremal values and the number $E^t$ of extremal values are collectively referred to as a number of extremal values.

The extremal value computation unit 13 receives the transfer source data distribution and the transfer destination data distribution, finds an extremal value of the transfer source data distribution with using the transfer source data distribution, and finds an extremal value of the transfer destination data distribution with using the transfer destination data distribution.

When the feature data distribution 102S satisfies $y=f^s(x)$ and the number $E^s$ of extremal values is n, each coordinate pair $(x_i^s, y_i^s)$ included in the extremal value coordinate group $G^s$ is defined as in [Formula 1]. [Formula 1] is also a specific example of the extremal value coordinate group $G^s$. A dimensionality of each coordinate included in the extremal value coordinate group $G^s$ is not limited to 2. However, 2 is employed as the dimension of each relevant coordinate for the sake of descriptive convenience. The extremal value coordinate group $G^t$ is defined in the same manner as in [Formula 1]. Note that a variable s is an individual element of a set S consisting of every given feature data distribution 102S. Namely, $s \in S$.

$$\left\{ (x_i^s, y_i^s) \in \mathbb{R}^2 \middle| \begin{array}{c} i = 1, \ldots, n, s \in S, \\ y_i^s = f^s(x_i^s) \geq f(x_{\varepsilon_i}^s) \vee y_i^s = f^s(x_i^s) \leq f(x_{\varepsilon_i}^s), \\ x_{\varepsilon_i}^s \in [x_i^s - \varepsilon, x_i^s + \varepsilon] \end{array} \right\} \quad \text{[Formula 1]}$$

Figure 2:
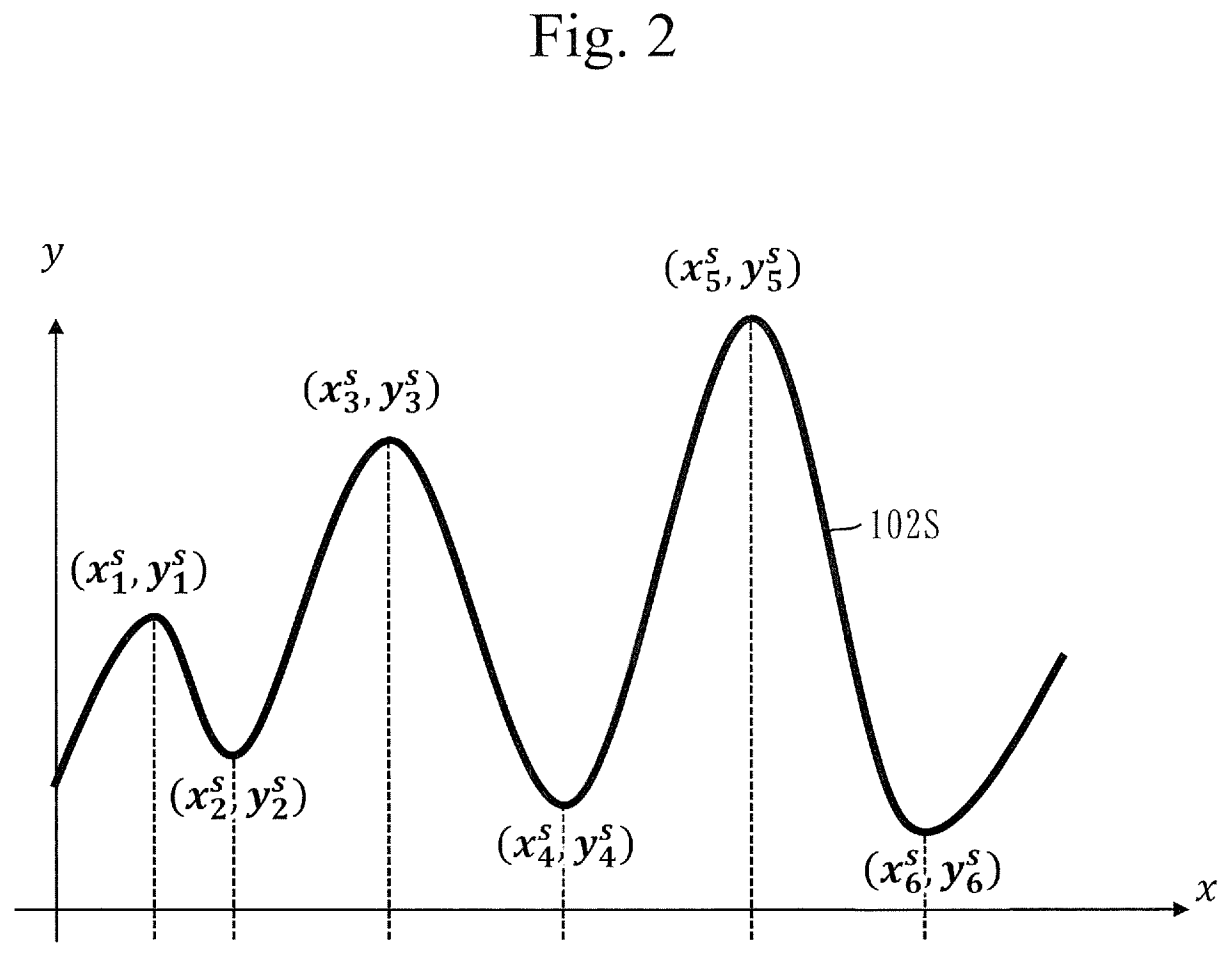

FIG. 2 illustrates a specific example of the feature data distribution 102S. FIG. 2 illustrates specific examples of individual extremal values included in the extremal value coordinate group $G^s$ in a case where n indicated in [Formula 1] is 6.

The grouping unit 14 generates learning data 104 with using the extremal value data 103S, and saves the generated learning data 104 to the dataset storage unit 15. The learning data 104 includes training data and teaching data. In the learning data 104, the training data consists of extremal value coordinates included in the extremal value coordinate group $G^s$. The teaching data is data $ID^s$ corresponding to the feature data distribution 102S having extremal values which are training data. The teaching data is also a label. The label is also an identifier that identifies a transfer source data candidate 2.

The grouping unit 14 classifies the learning data 104 according to the number $E^s$ of the extremal values corresponding to the learning data 104, and saves the learning data 104 to the dataset storage unit 15. The number $E^s$ of extremal values corresponding to the learning data 104 is the number $E^s$ of extremal values included in the extremal value coordinate group $G^s$ that includes the extremal value coordinates included in the learning data 104.

The dataset storage unit 15 stores datasets 105-1 to 105-N. The dataset storage unit 15 is also called a storage unit of datasets 1 to N. Note that N is a constant expressing a maximum value of the number $E^s$ of extremal values, and may be changed dynamically. A dataset 105-$n$ ($1 \leq n \leq N$ where n is an integer) is a set that includes, as elements, pieces of learning data 104 each corresponding to a feature data distribution 102S in which a number $E^s$ of extremal values is n. That is, n is a variable corresponding to the number $E^s$ of extremal values. At least some of the datasets 105-1 to 105-N may be empty data.

Each transfer source extremal value is associated with an identifier that identifies a transfer source data candidate 2 corresponding to a feature data distribution 102S having an extremal value corresponding to that each transfer source extremal value. Each transfer source extremal value belongs to at least one dataset 105 according to the number of transfer source extremal values included in the transfer source extremal value group that includes the transfer source extremal values. A dataset 105 is prepared per value expressed by the number of extremal values. In the present embodiment, each dataset 105 includes transfer source extremal values corresponding to the number of transfer source extremal values corresponding to that each dataset 105. The number of transfer source values corresponding to the dataset 105-$n$ is n. When the number of transfer source extremal values is n, the transfer source extremal values corresponding to the number of transfer source extremal values are transfer source extremal values of the feature data distribution 102S having n of transfer source extremal values.

[Formula 2] indicates a specific example of the dataset 105-$n$ generated from all the feature data distributions 102S in each of which a number $E^s$ of extremal values is n ($=|\{(x_i^s, y_i^s)\}|$).

$$g_n = \{((x_i^s, y_i^s), c^s) | |\{(x_i^s, y_i^s)\}| = n, i = 1, \ldots, n, s \in S\} \quad \text{[Formula 2]}$$

Note that the dataset 105-$n$ is expressed as a set $g_n$, each coordinate pair included in the extremal value coordinate group $G^s$ is expressed as $(x_i^s, y_i^s)$, and the data $ID^s$ is expressed as $c^s$.

FIG. 3 illustrates a specific example of the datasets 105. An upper part of FIG. 3 illustrates the extremal value coordinate groups $G^s$ in which $G^{s1}$, $G^{s2}$, . . . , $G^{sn}$ are individual extremal value coordinate groups $G^s$. Here, a superscript is a label indicating data $ID^s$ corresponding to the feature data distribution 102S having extremal value coordinates included in each extremal value coordinate group $G^s$.

A lower part of FIG. 3 illustrates the datasets 105 which correspond to the extremal value coordinate groups $G^s$ illustrated in the upper part of FIG. 3. The number $E^s$ of extremal values corresponding to each of $G^{s1}$ and $G^{sn}$ is 3. Hence, the elements of $G^{s1}$ and $G^{sn}$ are included in the elements included in the dataset 105-3. The number $E^s$ of extremal values corresponding to $G^{s2}$ is 1. Hence, the elements of $G^{s2}$ are included in the elements included in the dataset 105-1.

The model creation unit 16 performs learning with using the dataset 105, thereby creating a classifier 106 which is a learning model. Specifically, the model creation unit 16 acquires the dataset 105-$n$ from the dataset storage unit 15 and creates a classifier 106-$n$ with using the acquired dataset 105-$n$. Namely, the model creation unit 16 creates the classifier 106 for each number $E^s$ of extremal values. If the dataset 105-$n$ is empty, the model creation unit 16 need not create a classifier 106-$n$. The classifier 106 which is a learning model is a model corresponding to each dataset 105, is a model used for estimating an identifier corresponding to a given coordinate group, and is a model used for classifying each extremal value of the feature data distribution 102T. Specifically, the classifier 106-$n$ finds a probability (class membership probability) that each extremal value of the feature data distribution 102T in which a number $E^t$ of extremal values is n belongs to a class corresponding to each feature data distribution 102S in which a number $E^s$ of extremal values is n. The learning model may be merely expressed as a model.

In a specific example, the model creation unit 16 uses k-nearest neighbor (k-nearest neighbor algorithm, KNN), support vector classification (SVC), or the like, as a learning algorithm to be used for learning.

The classifier storage unit 17 stores classifiers 106-1 to 106-N. The classifier storage unit 17 is also called a storage unit of classifiers 1 to N. A classifier 106-$n$ corresponds to a feature data distribution 102S in which number $E^s$ of extremal values is n.

The model determination unit 18 determines the classifier 106 to be used by the similarity degree calculation unit 19, with using the extremal value coordinate group $G^t$. In a specific example, when the number $E^t$ of extremal values is m (=|{$(x_i^t, y_i^t)$}|), the model determination unit 18 acquires a classifier 106-$m$ from the classifier storage unit 17, and determines the acquired classifier 106-$m$ as the classifier 106 to be used by the similarity degree calculation unit 19.

The model determination unit 18 generates inference data 108 that includes the determined classifier 106. The inference data 108 includes the extremal value coordinate group $G^t$, and the classifier 106 corresponding to the extremal value coordinate group $G^t$. Inference data 108-$m$ is inference data 108 that includes the extremal value coordinate group $G^t$ in which a number $E^t$ of extremal value is m.

The model determination unit 18 determines, from at least one learning model, a learning model as a determination model according to the number of extremal values included in the extremal value coordinate group $G^t$.

The similarity degree calculation unit 19 finds a similarity degree between each of at least one feature data distribution 102S and the feature data distribution 102T with using the classifier 106 and the extremal value coordinate group $G^t$ which are included in the inference data 108, and outputs similarity degree data 109 including the similarity degree that was found. The similarity degree data 109 includes a label of the data $ID^s$ and a similarity degree corresponding to the data $ID^s$.

The similarity degree calculation unit 19 finds the similarity degree with using the determination model and the extremal value coordinate group $G^t$. The determination model is generated on a basis of the extremal value coordinate group $G^s$. Hence, the similarity degree calculation unit 19 finds the similarity degree between each feature data distribution 102S and the feature data distribution 102T on a basis of the extremal value coordinate group $G^s$ and the extremal value coordinate group $G^t$ which correspond to that each feature data distribution 102S.

A specific example of the similarity will be described below. [Formula 3] indicates a class membership probability of each $(x_i^t, y_i^t)$ per estimation class $c_j$. Output is expressed with a format "estimated class (class membership probability)". A number of outputs for one input is a total number of feature data distributions 102S in each of which a number $E^s$ of extremal values is m.

$$\text{input: } (x_1^t, y_1^t) \rightarrow \text{output} : c_1\left(p_{c_1}^1\right), \dots, c_j\left(p_{c_j}^1\right), \dots \quad \text{[Formula 3]}$$

$$\dots \qquad \dots$$

$$\text{input: } (x_m^t, y_m^t) \rightarrow \text{output} : c_1\left(p_{c_1}^m\right), \dots, c_j\left(p_{c_j}^m\right), \dots$$

In a specific example, $\text{score}(c_j)$ indicating a similarity degree between the feature data distribution 102T and the estimation class $c_j$ is indicated as in [Formula 4]. Note that $\text{score}(c_j)$ is also a similarity degree between the transfer destination data 3 and each transfer source data candidate 2.

$$\text{score}(c_j) = \sum_{i=1}^{m}\left(w_i \cdot p_{c_j}^i\right) \quad \text{[Formula 4]}$$

Note that $w_i$ is a weight parameter indicating how much each extremal value $(x_i^s, y_i^s)$ is considered important.

The data determination unit 20 is also called a transfer source data determination unit. The data determination unit 20 determines transfer source data from at least one transfer source data candidate 2 on a basis of the similarity degree data 109 and a determination condition, and outputs determination data 4 including the determined transfer source data. The determination data 4 includes a label indicating the transfer source data candidate 2, and a similarity degree corresponding to the relevant transfer source data candidate 2. The determination condition is a condition under which the data determination unit 20 determines the transfer source data candidate 2 as transfer source data. A specific example of the determination condition is that the similarity degree should be equal to or more than a certain threshold value. The data determination unit 20 determines a transfer source data candidate 2 corresponding to a similarity degree that satisfies the determination condition, as the transfer source data.

In a specific example, the data determination unit 20 identifies data $ID^s$ corresponding to the similarity degree that satisfies the determination condition, and outputs the transfer source data candidate 2 and the similarity degree that correspond to the identified ID'.

Figure 4:
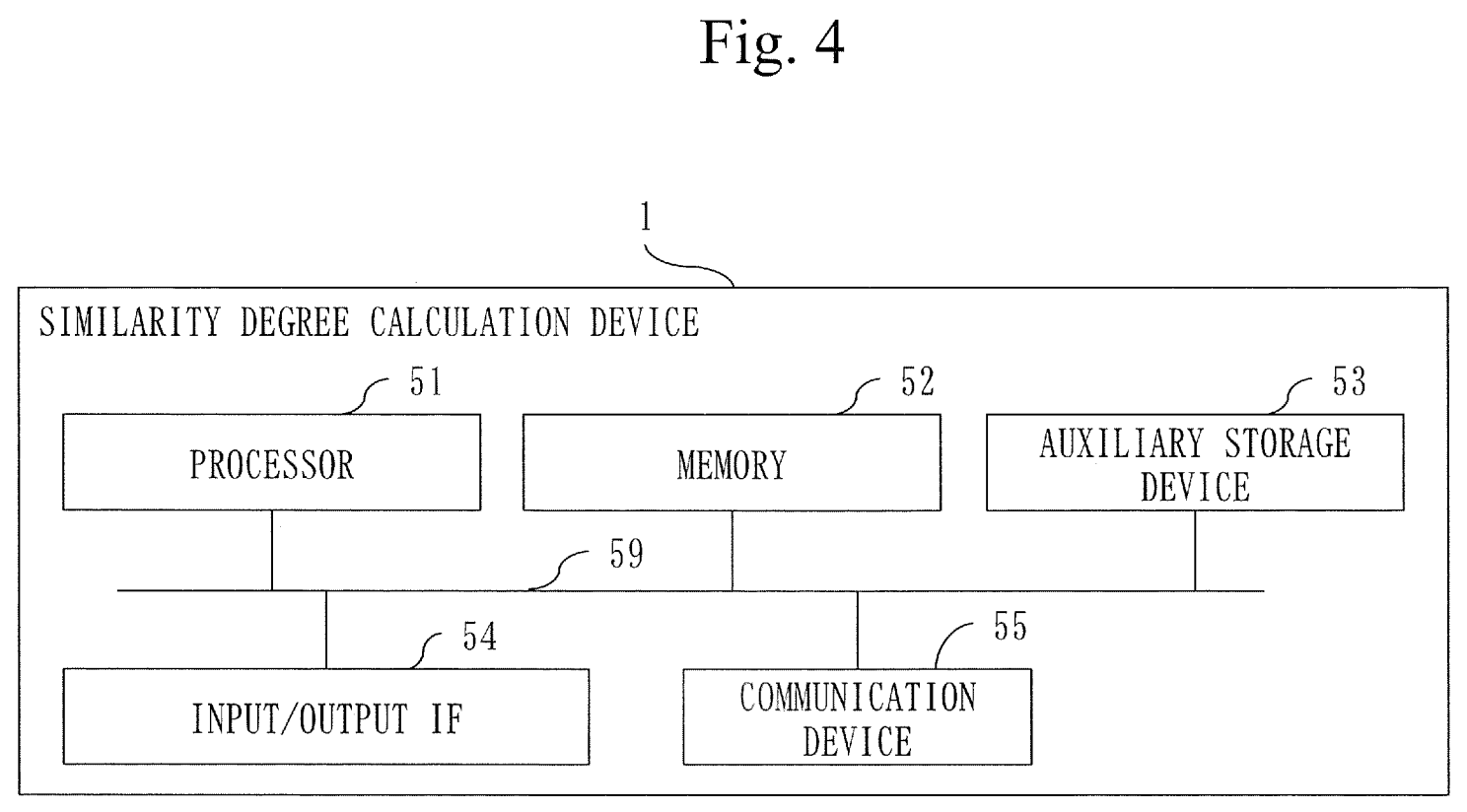

FIG. 4 illustrates a hardware configuration example of the similarity degree calculation device 1 according to the present embodiment. The similarity degree calculation device 1 is formed of a computer. The similarity degree calculation device 1 may be formed of a plurality of computers.

The similarity degree calculation device 1 may be operated in a server (computer) in cloud computing, or may be operated in a server (computer) in edge computing.

The similarity degree calculation device 1 is a computer provided with hardware devices such as a processor 51, a memory 52, an auxiliary storage device 53, an input/output interface (IF) 54, and a communication device 55, as illustrated in FIG. 4. These hardware devices are connected to each other via a signal line 59.

The processor 51 is an integrated circuit (IC) to perform computation processing, and controls the hardware devices provided to the computer. A specific example of the processor 51 is a central processing unit (CPU), a digital signal processor (DSP), or a graphics processing unit (GPU).

The similarity degree calculation device 1 may be provided with a plurality of processors that substitute for the processor 51. The plurality of processors share roles of the processor 51.

The memory 52 is typically a volatile storage device. The memory 52 is called a main storage device or a main memory as well. A specific example of the memory 52 is a random-access memory (RAM). Data stored in the memory 52 is saved in the auxiliary storage device 53 as necessary.

The auxiliary storage device 53 is typically a non-volatile storage device. A specific example of the auxiliary storage device 53 is a read-only memory (ROM), a hard disk drive (HDD), or a flash memory. Data stored in the auxiliary storage device 53 is loaded to the memory 52 as necessary.

The memory 52 and the auxiliary storage device 53 may be formed integrally.

The input/output IF 54 is a port to which an input device and an output device are to be connected. A specific example of the input/output IF 54 is a universal serial bus (USB) terminal. A specific example of the input device is a keyboard/mouse. A specific example of the output device is a display.

The communication device 55 is a receiver/transmitter. A specific example of the communication device 55 is a communication chip or a network interface card (NIC).

Each unit in the similarity degree calculation device 1 may appropriately use the communication device 55 when communicating with another device or the like. Each unit in the similarity degree calculation device 1 may receive data via the input/output IF 54, or may receive data via the communication device 55.

The auxiliary storage device 53 stores a similarity degree calculation program. The similarity degree calculation program is a program that causes the computer to implement functions of the individual units provided to the similarity degree calculation device 1. The similarity degree calculation program may be formed of a plurality of files. The similarity degree calculation program is loaded to the memory 52 and is run by the processor 51. The functions of the individual units provided to the similarity degree calculation device 1 are implemented by software.

Data used when running the similarity degree calculation program, data obtained by running the similarity degree calculation program, and so on are stored in the storage device appropriately. The individual units in the similarity degree calculation device 1 utilize a storage device appropriately. In a specific example, the storage device is formed of at least one of: the memory 52; the auxiliary storage device 53; a register in the processor 51; and a cache memory in the processor 51. Note that data and information sometimes have the same meaning. The storage device may be independent of the computer. The dataset storage unit 15 and the classifier storage unit 17 are each formed of a storage device.

The functions of the memory 52 and auxiliary storage device 53 may be implemented by another storage device.

The similarity degree calculation program may be recorded in a computer-readable non-volatile recording medium. A specific example of the non-volatile recording medium is an optical disk or a flash memory. The similarity degree calculation program may be provided as a program product.

Description of Operations

An operation procedure of the similarity degree calculation device 1 corresponds to a similarity degree calculation method. A program that implements operations of the similarity degree calculation device 1 corresponds to the similarity degree calculation program.

The similarity degree calculation device 1 evaluates the similarity degree between the feature data distribution 102S and the feature data distribution 102T according to two following basic policies.

Policy (1): When a certain extremal value of the feature data distribution 102S is close to a certain extremal value of the feature data distribution 102T, the similarity degree calculation device 1 concludes that, at the relevant certain extremal value of the feature data distribution 102S, the feature data distribution 102S is partly similar to the feature data distribution 102T. Note that when a certain extremal value of the feature data distribution 102T and a certain extreme value of the feature data distribution 102S are closer to each other, the similarity degree calculation device 1 may conclude that the feature data distribution 102S is partly more similar to the feature data distribution 102T.

Policy (2): The similarity degree calculation device 1 calculates a similarity degree to be higher for a feature data distribution 102S having more extreme values that are partly similar.

Figure 5:
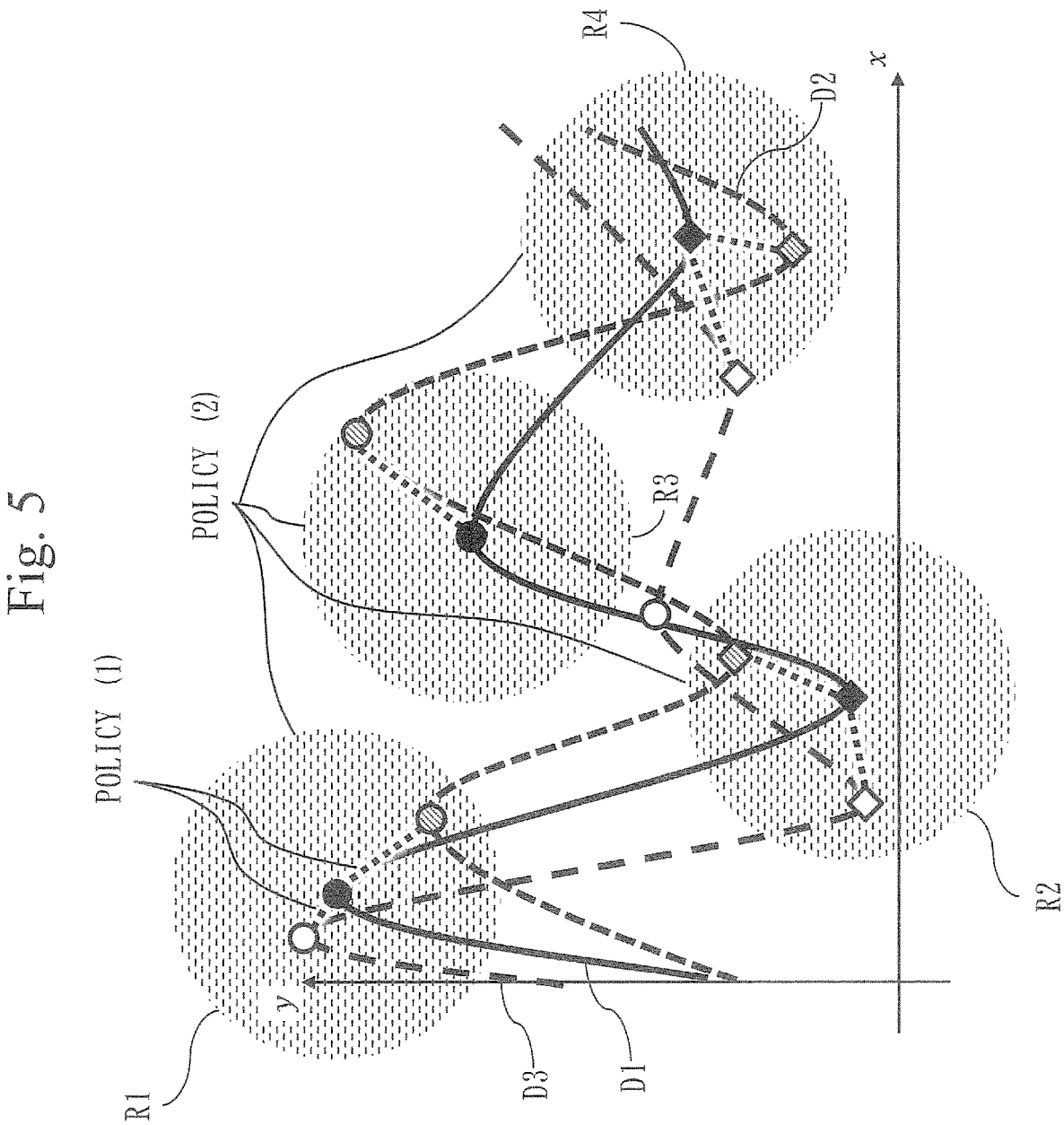
FIG. 5 is a diagram explaining an overview of operations of the similarity degree calculation device 1 according to Embodiment 1.

FIG. 5 is a diagram that specifically explains the policies indicated as the policy (1) and the policy (2) mentioned above. In FIG. 5, two feature data distributions 102S (a transfer source data distribution D2 and a transfer source data distribution D3) and one transfer destination feature data distribution (transfer destination data distribution D1) are illustrated. Round dots are employed to illustrate maximal values. Square dots are employed to illustrate minimal values. A circle centered on an extremal value of the transfer destination data distribution D1 illustrates a region close to that extremal value. The close regions are referred to as neighboring regions R1 to R4. When a certain extremal value of a transfer source data distribution is close to a certain extremal value of the transfer destination data distribution D1, the two extremal values are connected to each other with a broken line.

In FIG. 5, the extremal values of the transfer source data distribution D2 are close to the extremal values of the transfer destination data distribution D1 in any one of the neighboring regions R1 to R4. Meanwhile, the extremal values of the transfer source data distribution D3 are close to extremal values of the transfer destination data distribution D1 only in the neighboring region R1, the neighboring region R2, and the neighboring region R4. Namely, the transfer source data distribution D2 has four extremal values that are partly similar, and the transfer source data distribution D3 has three extremal values that are partly similar. Hence, the transfer source data distribution D2 has more partly similar extremal values than the transfer source data distribution D3 does. Therefore, the similarity degree calculation device 1 calculates the individual similarity degrees such that the similarity degree corresponding to the transfer source data distribution D2 is higher than the similarity degree corresponding to the transfer source data distribution D3.

<Learning Phase>

Figure 6:
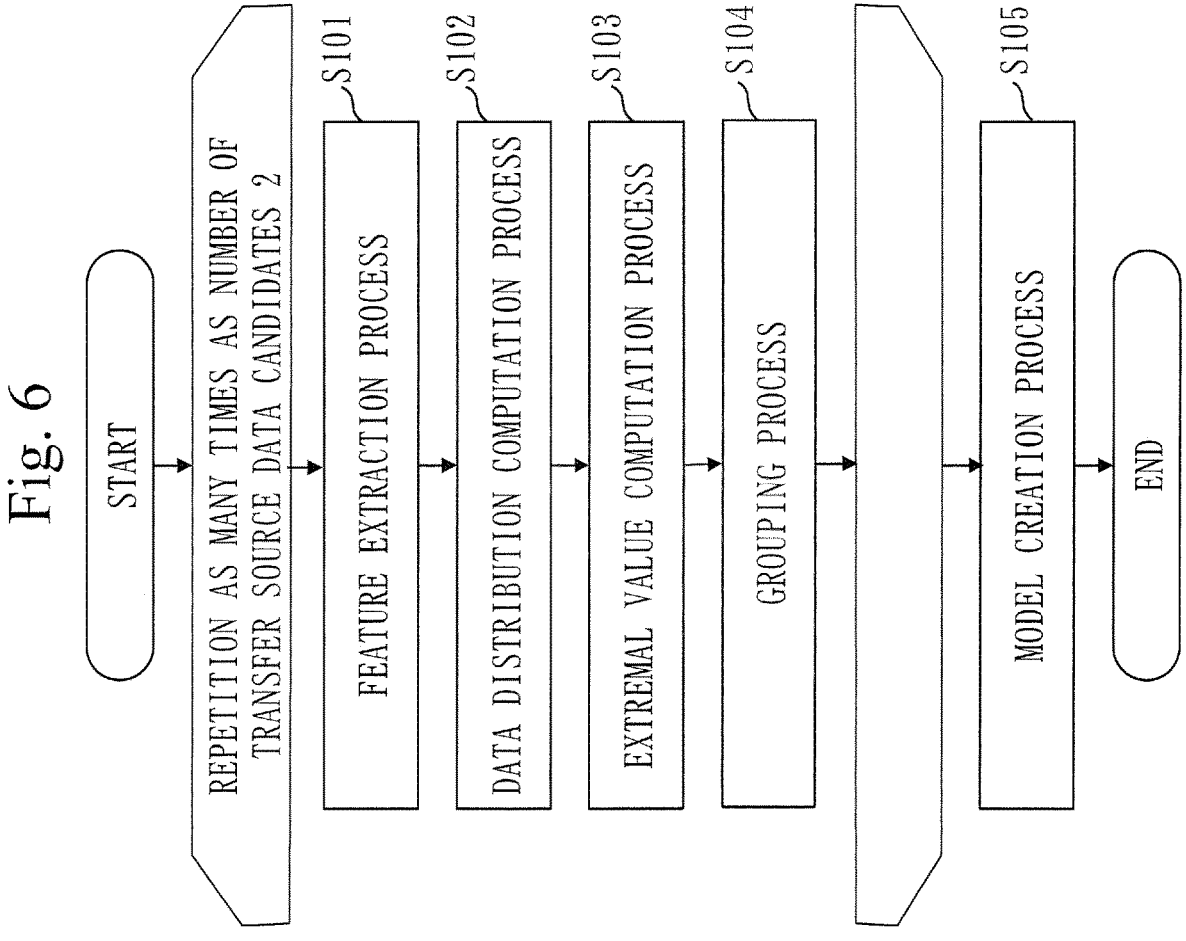
FIG. 6 is a flowchart illustrating operations concerning a learning phase of the similarity degree calculation device 1 according to Embodiment 1.

FIG. 6 is a flowchart illustrating an example of operations of the similarity degree calculation device 1 in the learning phase. The learning phase will be described with referring to FIG. 1 and FIG. 6.

(Step S101: Feature Extraction Process)

The feature extraction unit 11 receives the transfer source data candidate 2 as input, generates the feature vector 101S with using the received transfer source data candidate 2, and outputs the generated feature vector 101S.

(Step S102: Data Distribution Computation Process)

The data distribution computation unit 12 receives the feature vector 101S as input, generates the feature data distribution 102S with using the received feature vector 101S, and outputs the generated feature data distribution 102S.

Figure 7:
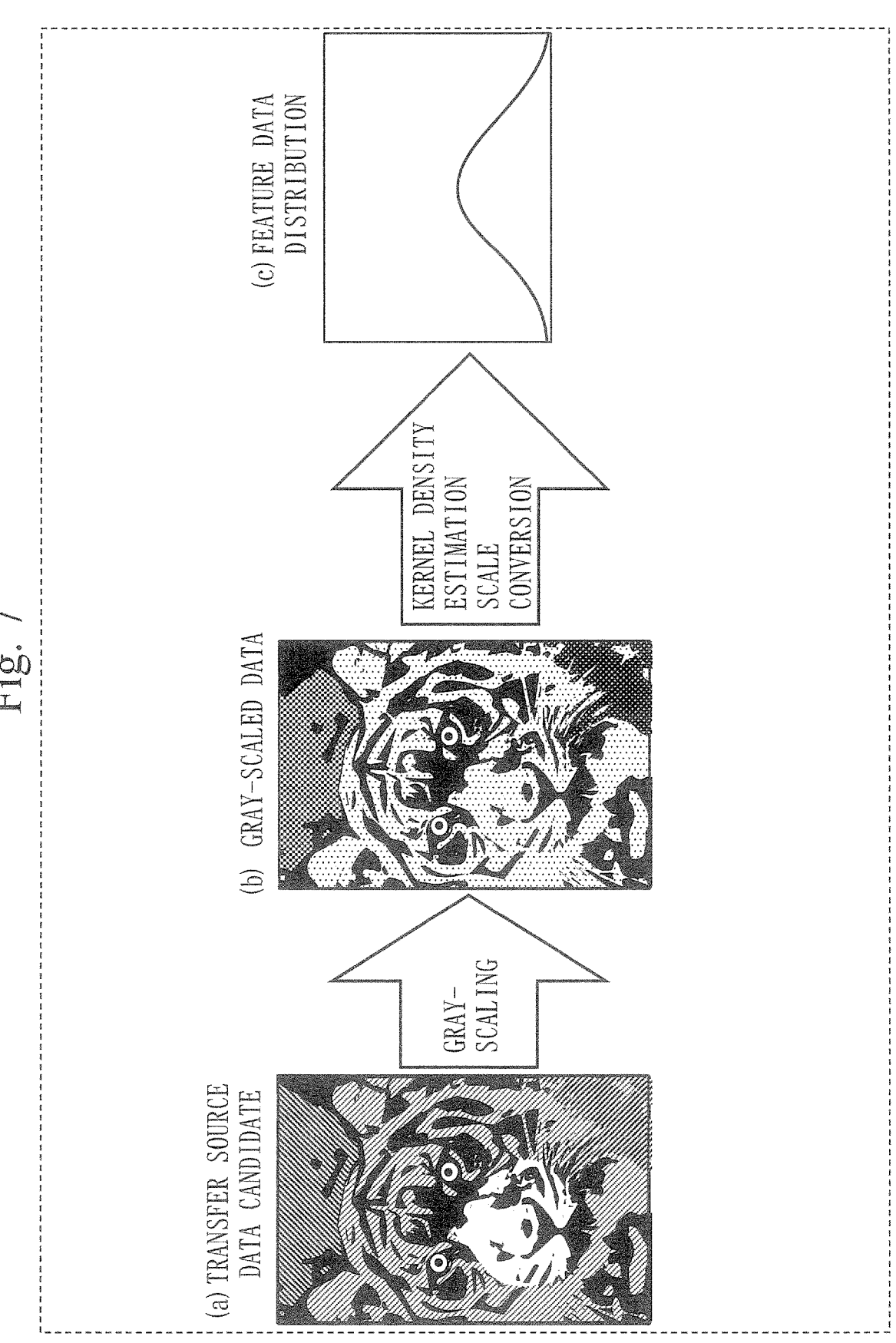
FIG. 7 is a diagram explaining the operations concerning the learning phase of the similarity degree calculation device 1 according to Embodiment 1, in which: (a) illustrates a transfer source data candidate; (b) illustrates a gray scale of (a); and (c) illustrates a feature data distribution corresponding to (b).

FIG. 7 is a diagram schematically explaining specific examples of step S101 and step S102. The specific examples of step S101 and step S102 will be described with referring to FIG. 7. In FIG. 7, although (a) illustrating the transfer source data candidate 2 is expressed in black and white, it is actually data of a color image showing a tiger.

When the transfer source data candidate 2 is given as an image and its feature resides in is its design, pattern, or the like, the feature extraction unit 11 may output, as a feature amount, data indicating an appearance frequency of pixel values. The data indicating the appearance frequency is data that can be expressed by histogram as well. The feature extraction unit 11 takes as the feature amount a probability of a proportion by which a pixel value x occupies one frame of image. In a specific example, the feature extraction unit 11 turns a color image into a gray scale image, finds a probability mass function $p(x)$ having the pixel value x as a random variable by kernel density estimation, and determines $(x, p(x))$ as the feature vector 101S. Note that (b) indicates gray-scaled data of (a).

The data distribution computation unit 12 receives $(x, p(x))$ and scale-converts $(x, p(x))$ to find the feature data distribution 102S. Note that (c) indicates the feature data distribution 102S which was found by the data distribution computation unit 12.

Note that $(x, p(x))$ which is the feature vector 101S can be regarded as the feature data distribution 102S. When the feature vector 101S can be regarded as the feature data distribution 102S, the data distribution computation unit 12 may take the received the feature vector 101S as the feature data distribution 102S with no change, or may take data scale-converted from the received feature vector 101S, as the feature data distribution 102S. An objective of scale conversion of the feature vector 101S is to enable easy comparison of the feature data distributions 102S with each other in a subsequent process. In a specific example of scale conversion, the data distribution computation unit 12 scale-converts a range of a minimum value to a maximum value of a data distribution to a range of [0, 1].

(Step S103: Extremal Value Computation Process)

The extremal value computation unit 13 receives the feature data distribution 102S as input, generates the extremal value data 103S with using the received feature data distribution 102S, and outputs the generated extremal value data 103S. Specifically, the extremal value computation unit 13 finds, from the feature data distribution 102S, a number of maximal values and a number of minimal values, and an extremal value coordinate group $G^s$ indicating coordinates of the maximal values and coordinates of the minimal values, and outputs the data that was found, as the extremal value data 103S.

(Step S104: Grouping Process)

The grouping unit 14 receives the extremal value data 103S as input, and saves the same number of pieces of learning data 104 as the number of extremal values indicated by the received extremal value data 103S, to the dataset storage unit 15.

The similarity degree calculation device 1 repeats steps S101 through S104 as many times as a number of prepared transfer source data candidates 2.

(Step S105: Model Creation Process)

The model creation unit 16 receives the dataset 105 as input, creates the classifier 106 by performing learning with using the received dataset 105, and saves the created classifier 106 to the classifier storage unit 17.

Figure 8:
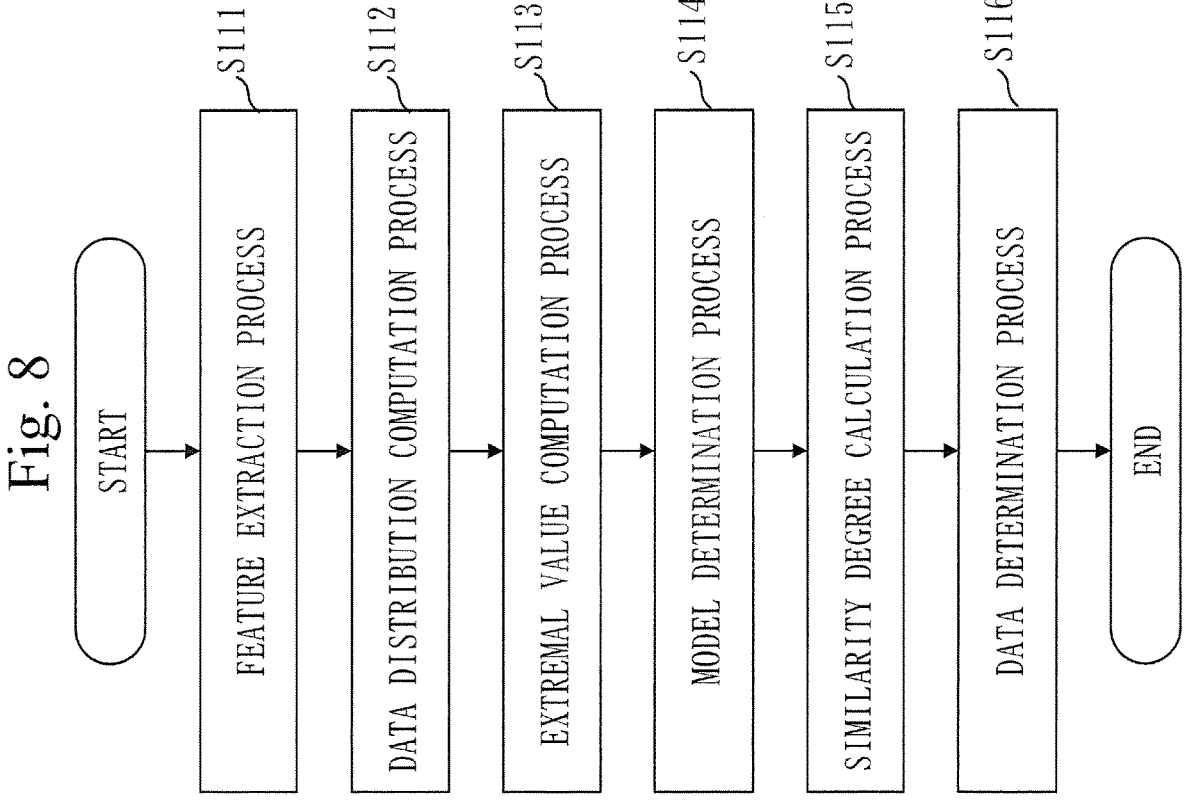
FIG. 8 is a flowchart illustrating operations concerning an inference phase of the similarity degree calculation device 1 according to Embodiment 1.

FIG. 8 is a flowchart illustrating an example of operations of the similarity degree calculation device 1 in the inference phase. The inference phase will be described with referring to FIG. 1 and FIG. 8.

<Inference Phase>

(Step S111: Feature Extraction Process)

The feature extraction unit 11 receives the transfer destination data 3 as input, generates the feature vector 101T with using the received transfer destination data 3, and outputs the generated feature vector 101T.

(Step S112: Data Distribution Computation Process)

The data distribution computation unit 12 receives the feature vector 101T as input, generates the feature data distribution 102T with using the received feature vector 101T, and outputs the generated feature data distribution 102T.

(step S113: Extremal Value Computation Process)

The extremal value computation unit 13 receives the feature data distribution 102T, generates the extremal value data 103T with using the received feature data distribution 102T, and outputs the generated extremal value data 103T.

(Step S114: Model Determination Process)

A description will be made below on a supposition that the number $E^t$ of extremal values is m.

The model determination unit 18 receives the extremal value data 103T as input, acquires the classifier 106-m which is a classifier 106 corresponding to the received extremal value data 103T, from the classifier storage unit 17, generates the inference data 108-m with using the extremal value coordinate group $G^t$ included in the received extremal value data 103T, and the acquired classifier 106-m, and outputs the generated inference data 108-m.

(Step S115: Similarity Degree Calculation Process)

The similarity degree calculation unit 19 receives the inference data 108-m as input, finds a similarity degree with using the classifier 106-m included in the received inference data 108-m, and the extremal value coordinate group $G^t$, and outputs the similarity degree data 109.

In a specific example, first, the similarity degree calculation unit 19 extracts extremal values from the received extremal value coordinate group $G^t$. With this extraction, the similarity degree calculation unit 19 creates a total of m pairs of extremal value coordinates $(x_i^t, y_i^t)$ (i=1, . . . , m). Note that each extremal value is also test data.

Next, the similarity degree calculation unit 19 inputs m pieces of test data to the classifier 106-m one by one, and finds a class membership probability for each estimation class. An estimation class is a class to which test data is estimated to belong. The similarity degree calculation unit 19 estimates that test data belongs to each class which is a candidate, and finds a class membership probability of the test data in each class. Note that hereinafter, a set of labels of an estimation class of $(x_i^t, y_i^t)$ is expressed as $C^t$, and an element of $C^t$ is expressed as $c_j$.

Next, the similarity degree calculation unit 19 computes score($c_j$) for $\forall\ c_j{\in}C^t$, and outputs ($c_j$, score($c_j$)) which is a pair of a label of the data $ID^s$ and a similarity degree corresponding to the data $ID^s$.

(Step S116: Data Determination Process)

The data determination unit 20 receives the similarity degree data 109 as input, generates the determination data 4 with using the received similarity degree data 109, and outputs the generated determination data 4.

Figure 9:
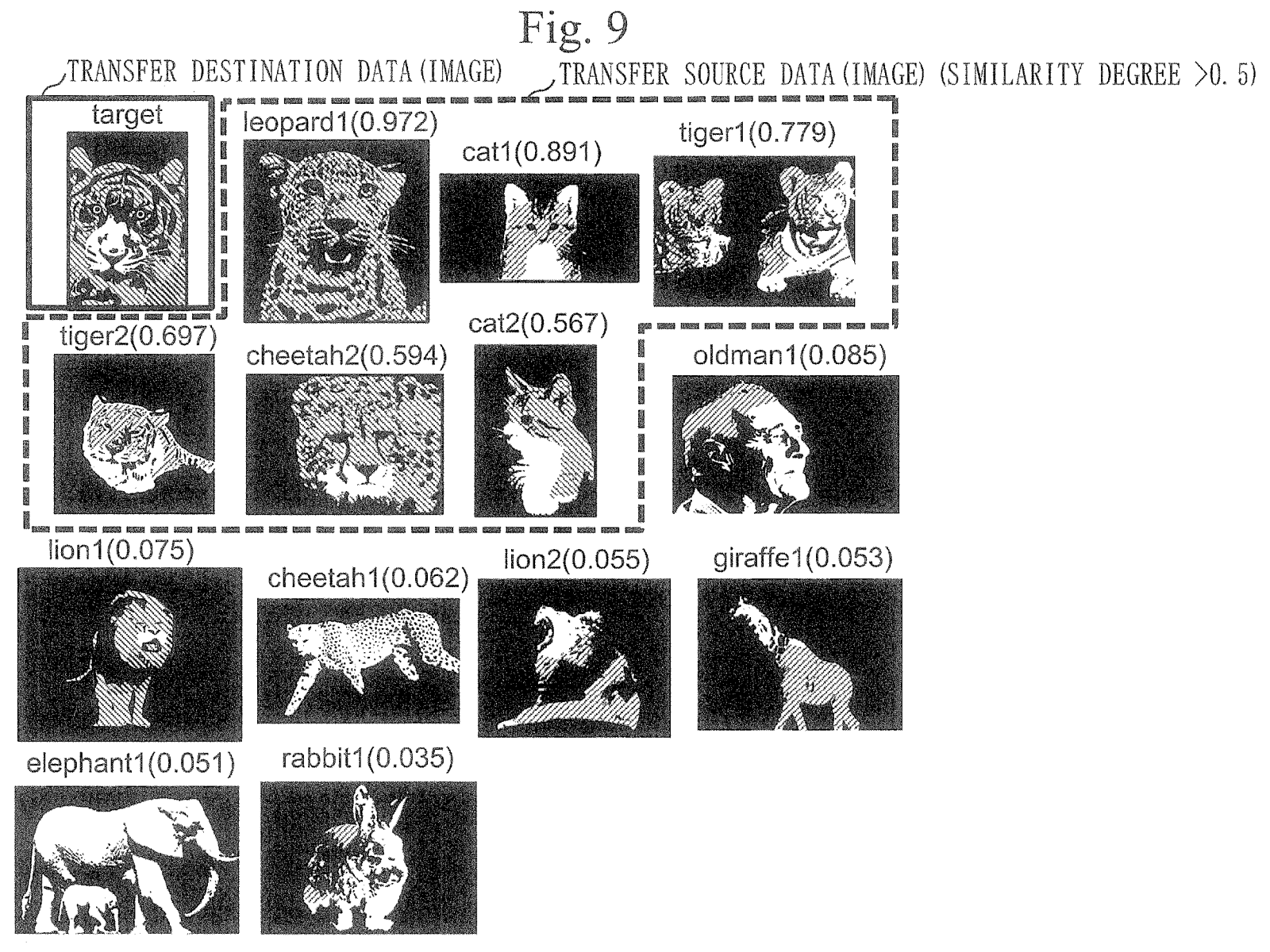

FIG. 9 is a diagram describing a specific example of how the data determination unit 20 identifies the transfer source data candidate 2. In FIG. 9, the transfer destination data 3 is an image of a tiger. Labels and similarity degrees of transfer source data candidates 2 corresponding to individual images of the transfer source data candidates 2 are described in a format "label (similarity degree) of the transfer source data candidate 2". Each image is actually a color photograph. In this example, the data determination unit 20 determines 0.5 as a threshold value, and uses as a determination condition the similarity degree being larger than the threshold value. At this time, the determination data 4 includes (leopard1, 0.972), (cat1, 0.891), (tiger1, 0.779), (tiger2, 0.697), (cheetah2, 0.594), and (cat2, 0.567). The similarity degrees of the other images are equal to or smaller than the threshold value. Thus, the data determination unit 20 does not select any other image.

As described above, the similarity degree calculation device 1 creates the classifier 106 by performing learning on a basis of one or more transfer source data candidates 2, and performs inference on a basis of one piece of transfer destination data 3 with using the created classifier 106. Then, the similarity degree calculation device 1 outputs transfer source data and a similarity degree corresponding to the relevant transfer source data on a basis of an inference result.

Description of Effect of Embodiment 1

As described above, according to a specific example, in the similarity degree calculation device 1 according to the present embodiment, first, the data distribution computation unit 12 outputs (x, p(x)) calculated from the feature vector 101S, as two-dimensional feature data distribution 102S. Next, the extremal value computation unit 13 calculates minimal values and maximal values of the feature data distribution 102S. Next, it is judged how close the extremal values of the extremal value coordinate group $G^s$ and the extremal values of the extremal value coordinate group $G^t$ are to each other in a distance relationship.

Therefore, according to the present embodiment, when compared to a case that employs the feature vector 101 unchanged, since the feature data distribution 102 is employed, the dimension of information indicating features can be lowered. Since a computation target is narrowed down to extremal values having features of a transfer destination, computation complexity of the similarity degree becomes low. Hence, according to the present embodiment, it is possible to find a similarity degree that is close to a similarity degree obtained when the feature data distribution 102 is employed unchanged, within a comparatively short processing time.

Also, the similarity degree calculation device 1 according to the present embodiment calculates, per extremal value of the feature data distribution 102T, a class membership probability indicating which one of classes corresponding to the transfer source data candidates 2 each relevant extremal value is supposed to belong to. The similarity degree calculation device 1 multiplies each class membership probability by an individual weight parameter $w_i$, and combines the multiplication results, thereby finding the similarity degree. Therefore, with the present embodiment, it is possible to increase an influence of a particular extremal value by raising $w_i$ (in a specific example, $w_i>1$) for the particular extremal value of the feature data distribution 102T. Also, in order to reduce the influence of the particular extremal value, it is possible to lower $w_i$ (in a specific example, $w_i<1$).

Therefore, with the present embodiment, when calculating the similarity degree, it is possible to calculate a similarity degree for which the extremal values (features) designated by the user is considered important.

The technique disclosed by Patent Literature 1 uses an existing similarity degree calculation method when evaluating a similarity degree of an image. The user is required to select an appropriate method that can detect a desired similarity degree, by taking a processing load and so on into account. Also, with this technique, it is difficult to control a degree of similarity. Specifically, with this technique, it is not possible to perform a process of evaluating a plurality of types of similarity degrees with using a single evaluation function, such as activating an operation close to an operation in exact match that takes only environmental noise into account, as in fingerprint authentication, and activating an operation close to an operation in fuzzy search that performs labeling with ignoring individual differences, as in image segmentation or activity recognition.

However, as described above, with the similarity degree calculation device 1 according to the present embodiment, the computation complexity concerning the similarity degree is low. By utilizing a weight, it is possible to evaluate a plurality of types of similarity degrees.

Other Configurations

Modification 1

Note that (x, p(x)) which is a feature data distribution 102 can be of any type as far as it reflects the features of the transfer source data candidate 2 and the transfer destination data 3 sufficiently and is approximated to a waveform.

As a specific example, there is a method in which Bag-of-Features (BoF) mentioned Non-Patent Literature 1 is employed for p(x). BoF is a technique of clustering a feature vector group extracted from source data such as an image, and generating classes ID and appearance frequency (histogram) related to clustering. In a specific example of a case that employs BoF, the feature extraction unit 11, upon reception of an image, outputs histograms of oriented gradients (HOG) mentioned in Non-Patent Literature 2 or scaled invariance feature transform (SIFT) mentioned in Non-Patent Literature 3, as a feature vector 101. After that, the data distribution computation unit 12 sets a class ID to x with using BoF, sets an appearance frequency of a class corresponding to the relevant class ID to p(x), and outputs (x, p(x)) as the feature data distribution 102.

Non-Patent Literature 1

Csurka, G., Dance, C. R., Fan, L., Willamowski, J. and Bray, C.: Visual Categorization with Bags of Keypoints, ECCV (European Conference on Computer Vision) International Workshop on Statistical Learning in Computer Vision, pp. 1-22 (2004).

Non-Patent Literature 2

Dalal, N. and Triggs, B.: Histograms of Oriented Gradients for Human Detection, 2005 IEEE (Institute of Electrical and Electronics Engineers) Computer Society Conference on Computer Vision and Pattern Recognition (CVPR '05), vol. 1, pp. 886-893, doi: 10.1109/CVPR. 2005. 177 (2005).

Non-Patent Literature 3

Lowe, D. G.: Distinctive Image Features from Scale-Invariant Keypoints, Int. J. Comput. Vision, Vol. 60, No. 2, pp. 91-110 (2004).

Modification 2

When the transfer source data candidate 2 is multidimensional time-series data acquired from a sensor or the like, in a specific example, the feature extraction unit 11 takes a plurality of sampling data as input in a time-series order, and treats a value summarized (dimensionality reduction) from each sampling data by principal component analysis, as a feature vector 101S.

In the present modification, the data distribution computation unit 12 may generate a feature data distribution 102S by connecting feature vectors 101S in a time-series order. Note that the relevant feature data distribution 102S is a data distribution whose extremal values are calculable.

Modification 3

Figure 10:
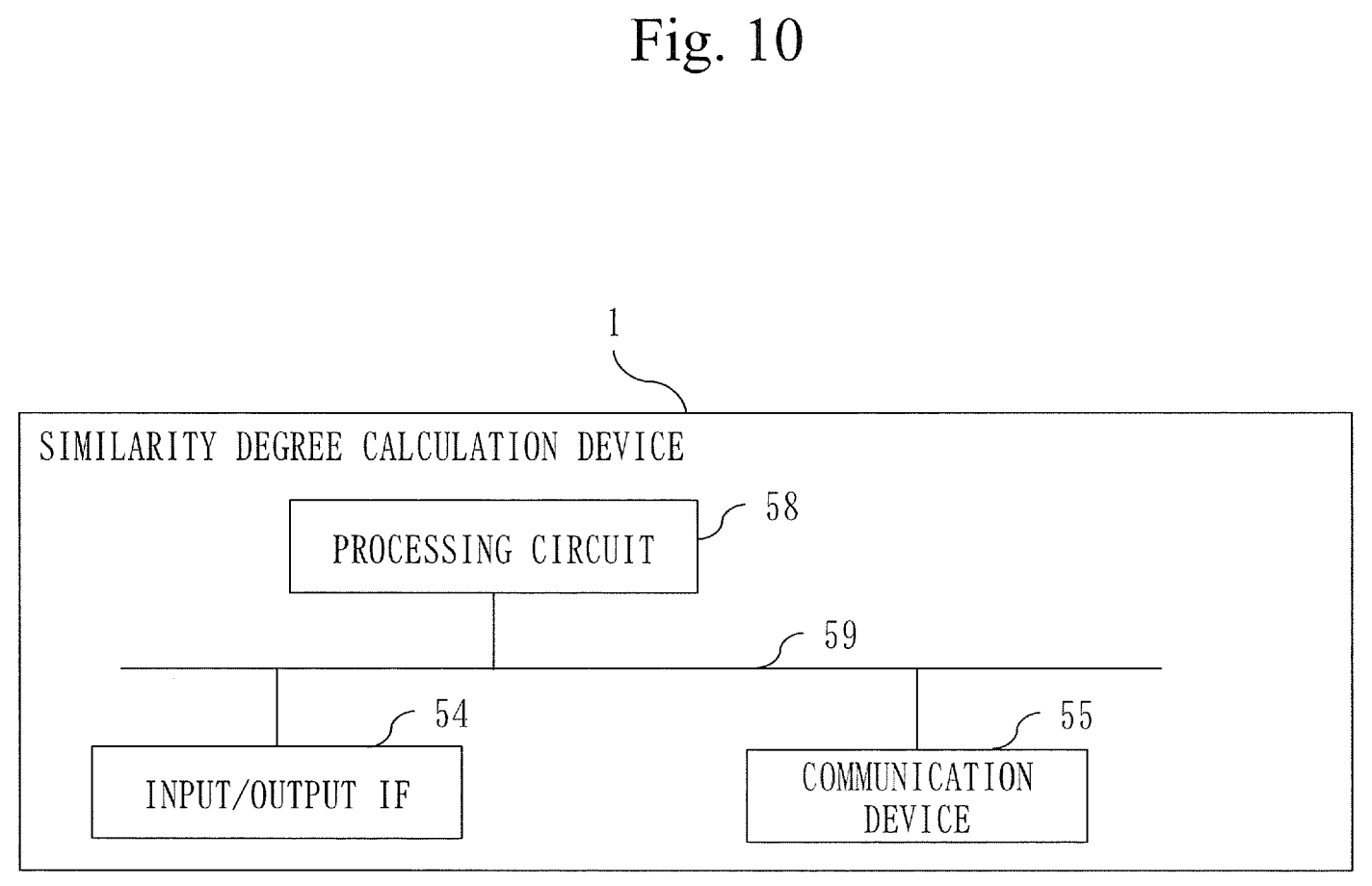

FIG. 10 illustrates a hardware configuration example of a similarity degree calculation device 1 according to the present modification.

The similarity degree calculation device 1 is provided with a processing circuit 58 in place of at least one of: a processor 51; a memory 52; and an auxiliary storage device 53, as illustrated in FIG. 10.

The processing circuit 58 is hardware that implements at least some of units provided to the similarity degree calculation device 1.

The processing circuit 58 maybe dedicated hardware, or may be a processor that runs a program stored in the memory 52.

When the processing circuit 58 is dedicated hardware, the processing circuit 58 is, in a specific example, one or a combination of a single circuit, a composite circuit, a programmed processor, a parallel-programmed processor, an application specific integrated circuit (ASIC), and a field programmable gate array (FPGA).

The similarity degree calculation device 1 may be provided with a plurality of circuits that substitute for the processing circuit 58. The plurality of processing circuits share roles of the processing circuit 58.

In the similarity degree calculation device 1, some of the functions may be implemented by dedicated hardware, and the remaining functions may be implemented by software or firmware.

The processing circuit 58 is, in a specific example, implemented by one or a combination of hardware, software, and firmware.

The processor 51, the memory 52, the auxiliary storage device 53, and the processing circuit 58 are collectively referred to as "processing circuitry". That is, the functions of individual function constituent elements of the similarity degree calculation device 1 are implemented by processing circuitry.

A similarity degree calculation device 1 according to another embodiment may have the same configuration as that of the present modification.

Embodiment 2

A description will be made below mainly regarding differences from the embodiment described above, with referring to drawings.

An overview of the present embodiment will be described. A similarity degree calculation device 1 according to the present embodiment transforms a coordinate system which expresses extremal values, for a purpose of preventing a minimal value of a feature data distribution 102S and a maximal value of a feature data distribution 102T from being matched incorrectly, or a maximal value of the feature data distribution 102S and a minimal value of the feature data distribution 102T from being matched incorrectly, when creating a learning model. This allows a learning model to distinguish a maximal value and a minimal value easily.

Figure 11:
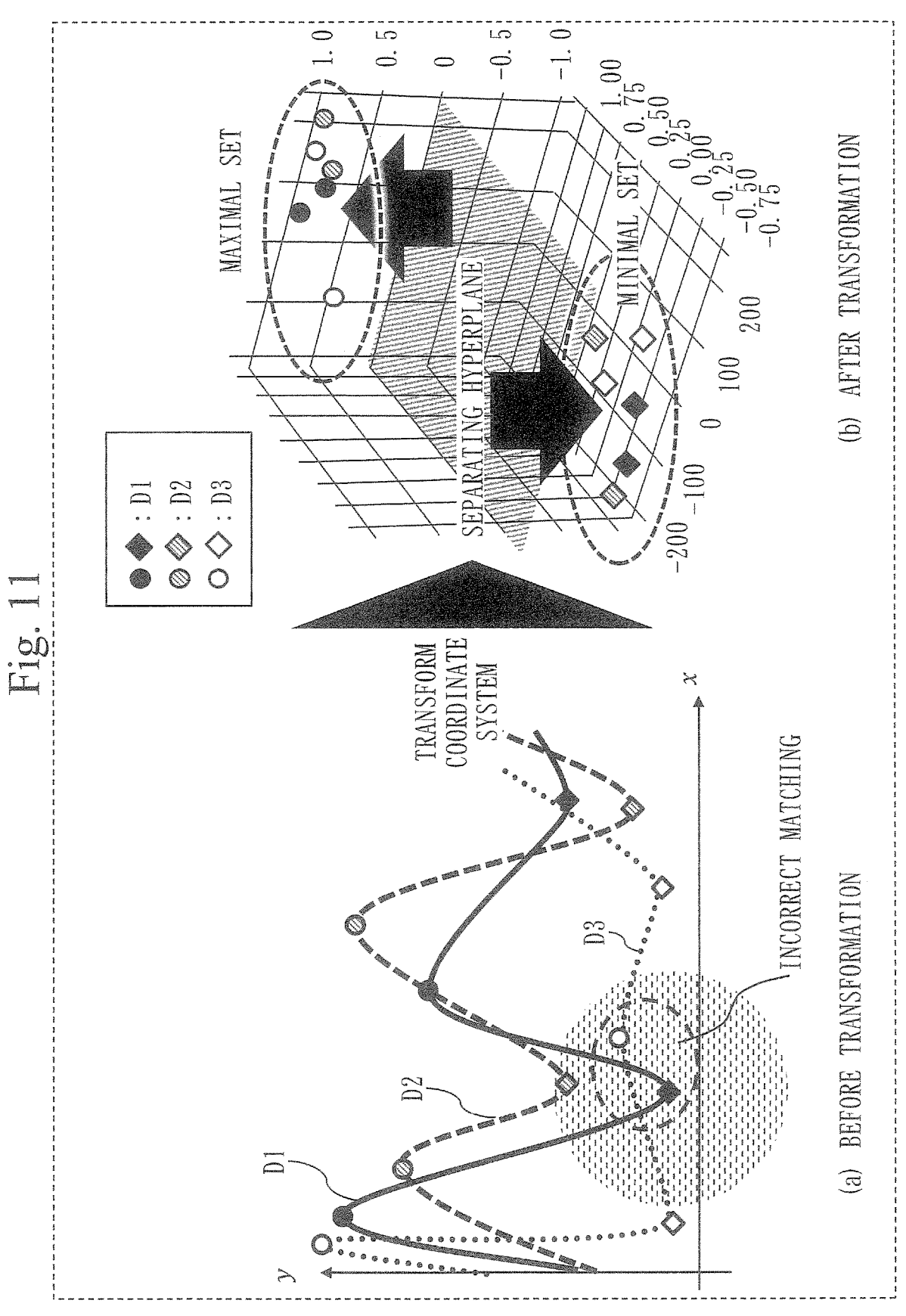
FIG. 11 includes diagrams explaining an overview of operations of a similarity degree calculation device 1 according to Embodiment 2, in which: (a) is a diagram explaining a state before transformation of a coordinate system; and (b) is a diagram explaining a state after transformation of the coordinate system.

FIG. 11 illustrates a specific example of an image of transforming a coordinate system which expresses extremal values. In FIG. 11, (a) illustrates an image of a state before transforming the coordinate system, and (b) illustrates an image of a state after transforming the coordinate system of extremal values indicated by projecting the extremal values in (a) to a higher dimensional space. The dimensionality of the relevant higher dimensional space is not limited to 3. In (b), a maximal set expresses a set of points to which maximal values indicated in (a) are projected, and a minimal set expresses a set of points to which minimal values indicated in (a) are projected. Incorrect matching in (a) signifies that one minimal value of a transfer destination data distribution D1 and one maximal value of a transfer source data distribution D3 are close to each other. The minimal value and the maximal value related to incorrect matching are clearly separated in (b) by a separating hyperplane as a boundary.

Description of Configuration

Figure 12:
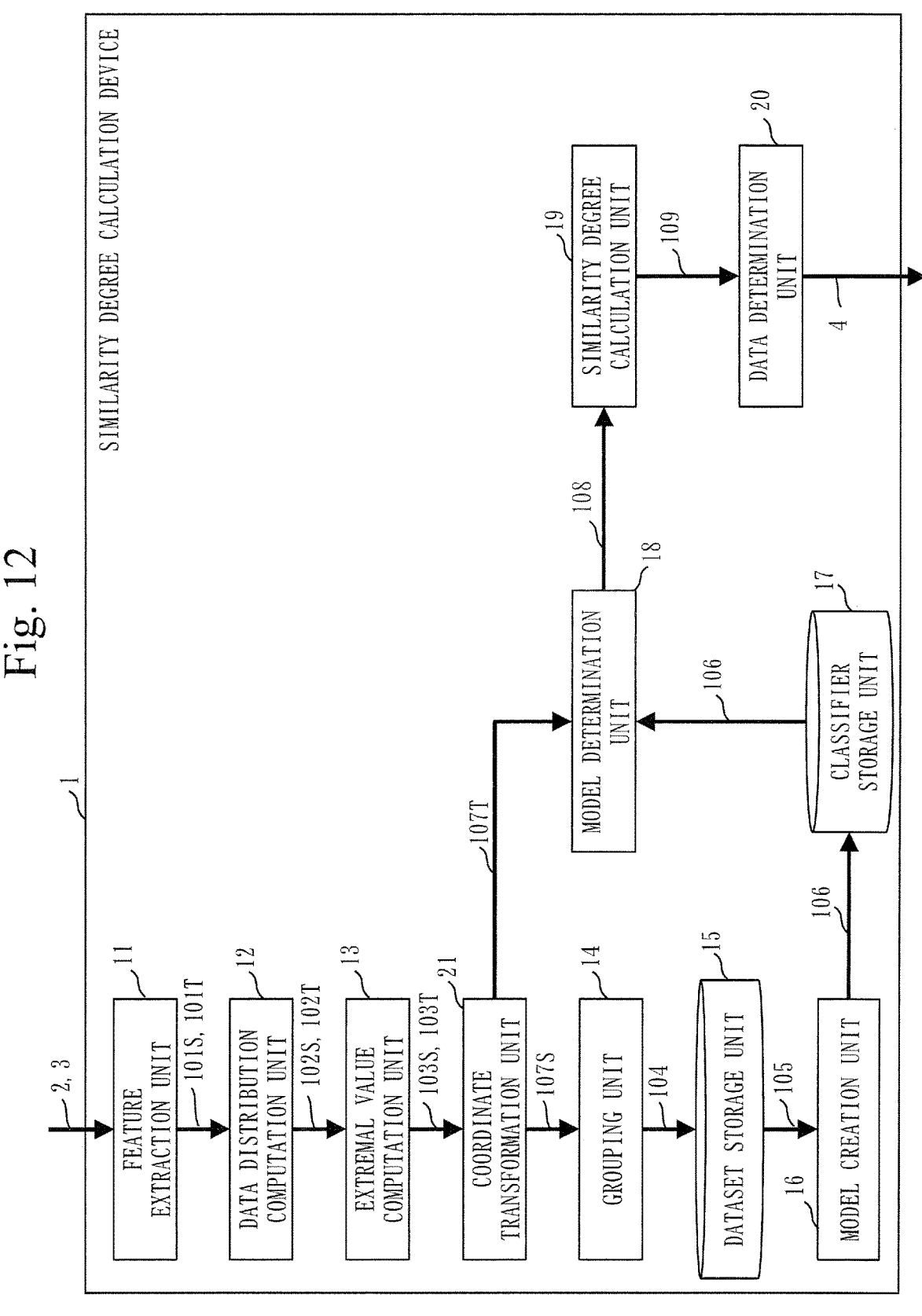
FIG. 12 is a configuration example of the similarity degree calculation device 1 according to Embodiment 2.

FIG. 12 illustrates a configuration example of the similarity degree calculation device 1 according to the present embodiment. As illustrated in FIG. 12, the similarity degree calculation device 1 is provided with a coordinate transformation unit 21 in addition to the constituent elements provided to the similarity degree calculation device 1 according to Embodiment 1.

The coordinate transformation unit 21 generates a transformation coordinate group $C^s$ with using extremal value data 103S, and outputs transformation extremal value data 107S including the generated transformation coordinate group $C^s$. The transformation extremal value data 107S includes the transformation coordinate group $C^s$, data $ID^s$, and a number $E^s$ of extremal values, and is called a transfer source transformation coordinate group as well. The transformation coordinate group $C^s$ is a set consisting of coordinates obtained by transforming a coordinate system of coordinates included in the extremal value coordinate group $G^s$. Each coordinate included in the extremal value coordinate group $G^s$ is also called a pre-transformation transfer source extremal value. The coordinate transformation unit 21 finds, as the transfer source extremal value, a coordinate obtained by projecting the pre-transformation transfer source extremal value to a space having a higher dimension than a dimension of the pre-transformation transfer source extremal value. The transformation coordinate group $C^s$ is also a subordinate concept of the extremal value coordinate group $G^s$. Each coordinate included in the transformation coordinate group $C^s$ is also a transfer source extremal value.

The coordinate transformation unit 21 generates a transformation coordinate group $C^t$ with using extremal value data 103T, and outputs transformation extremal value data 107T including the transformation coordinate group $C^t$ that has been transformed. The transformation extremal value data 107T includes the transformation coordinate group $C^t$ and a number $E^t$ of extremal values, and is called a transfer destination transformation coordinate group as well. The transformation coordinate group $C^t$ is a set consisting of coordinates obtained by transforming a coordinate system of coordinates included in the extremal value coordinate group $G^t$. Each coordinate included in the extremal value coordinate group $G^t$ is also called a pre-transformation transfer destination extremal value. The coordinate transformation unit 21 finds, as the transfer destination extremal value, a coordinate obtained by projecting the pre-transformation transfer destination extremal value to a space having a higher dimension than a dimension of the pre-transformation transfer destination extremal value. The transformation coordinate group $C^t$ is also a subordinate concept of the extremal value coordinate group $G^t$. Each coordinate included in the transformation coordinate group $C^t$ is also a transfer destination extremal value.

Each coordinate included in the transformation coordinate group $C^s$ is defined as in [Formula 5]. [Formula 5] is also a specific example of the transformation coordinate group $C^s$. In this example, the coordinate transformation unit 21 transforms each maximal value included in the extremal value coordinate group $G^s$ to 1, transforms each minimal value included in the extremal value coordinate group $G^s$ to $-1$, and adds the transformed coordinates to the coordinates included in the extremal value coordinate group $G^5$, thereby obtaining the transformation coordinate group $C^s$. In this example, each extremal value included in the transformation coordinate group $C^s$ is expressed as $(x_i^s, y_i^s, z_i)$. Each coordinate included in the transformation coordinate group $C^t$ is defined in the same manner as in [Formula 5].

$$\left\{ (x_i^s, y_i^s, z_i) \in \mathbb{R}^3 \middle| \begin{array}{c} |\{(x_i^s, y_i^s)\}| = n, i = 1, \ldots, n, s \in S, \\ z_i \in \{+1, -1\}, \\ z_i = \begin{cases} +1, & (x_i^s, y_i^s) \text{ is maximal} \\ -1, & (x_i^s, y_i^s) \text{ is minimal} \end{cases} \end{array} \right\} \quad \text{[Formula 5]}$$

Description of Operations

A description will now be made below mainly regarding differences from the operations of the similarity degree calculation device 1 according to Embodiment 1.

<Learning Phase>

Figure 13:
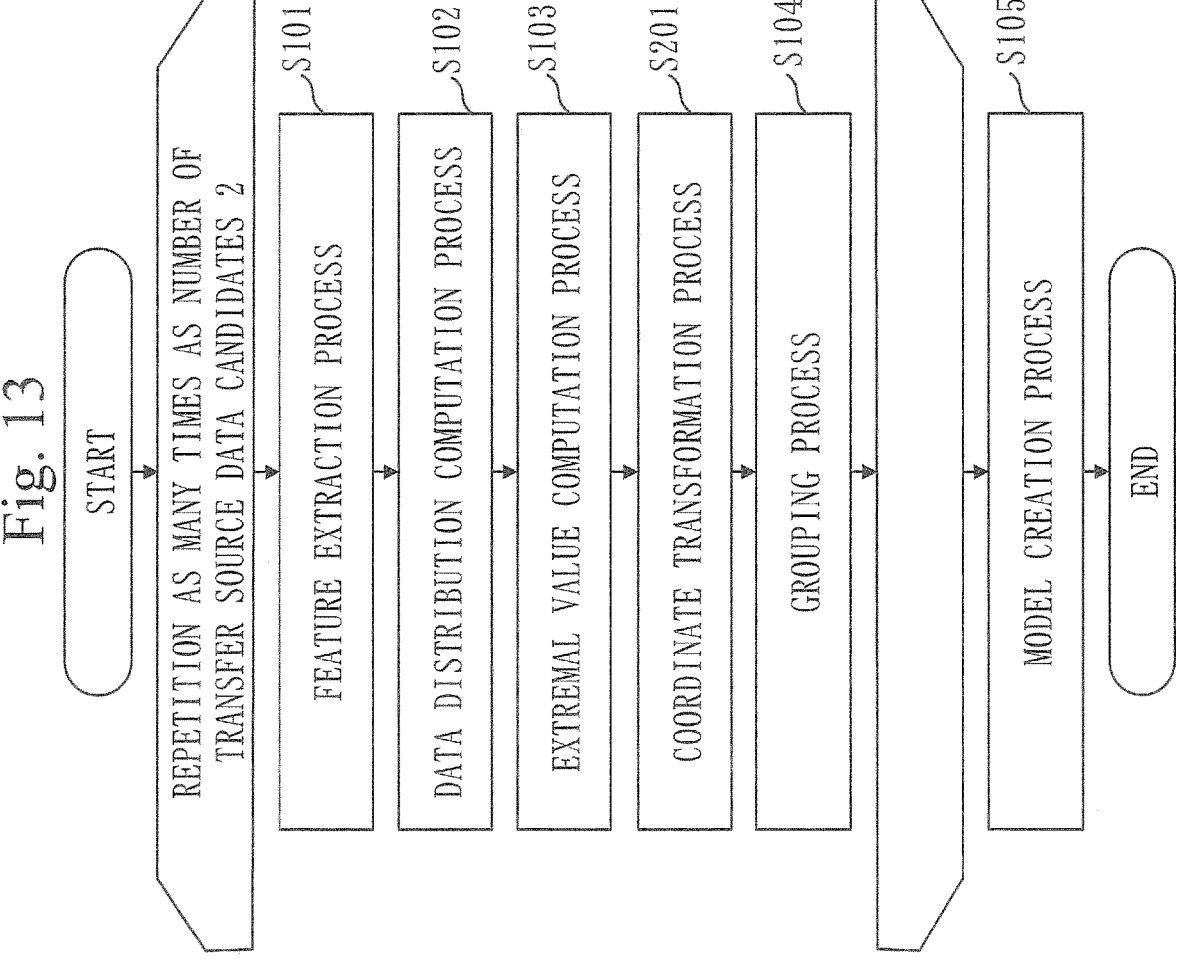
FIG. 13 is a flowchart illustrating operations concerning a learning phase of the similarity degree calculation device 1 according to Embodiment 2.

FIG. 13 is a flowchart illustrating an example of operations of the similarity degree calculation device 1 in the learning phase. The learning phase will be described with referring to FIG. 12 and FIG. 13.

(Step S201: Coordinate Transformation Process)

The coordinate transformation unit 21 receives the extremal value data 103S as input, generates the transformation extremal value data 107S with using the received extremal value data 103S, and outputs the generated transformation extremal value data 107S.

(Step S104: Grouping Process)

A process of step S104 is a process equivalent to the grouping process related to the learning phase of Embodiment 1 but the extremal value data 103S of Embodiment 1 is replaced by the transformation extremal value data 107S.

<Inference Phase>

Figure 14:
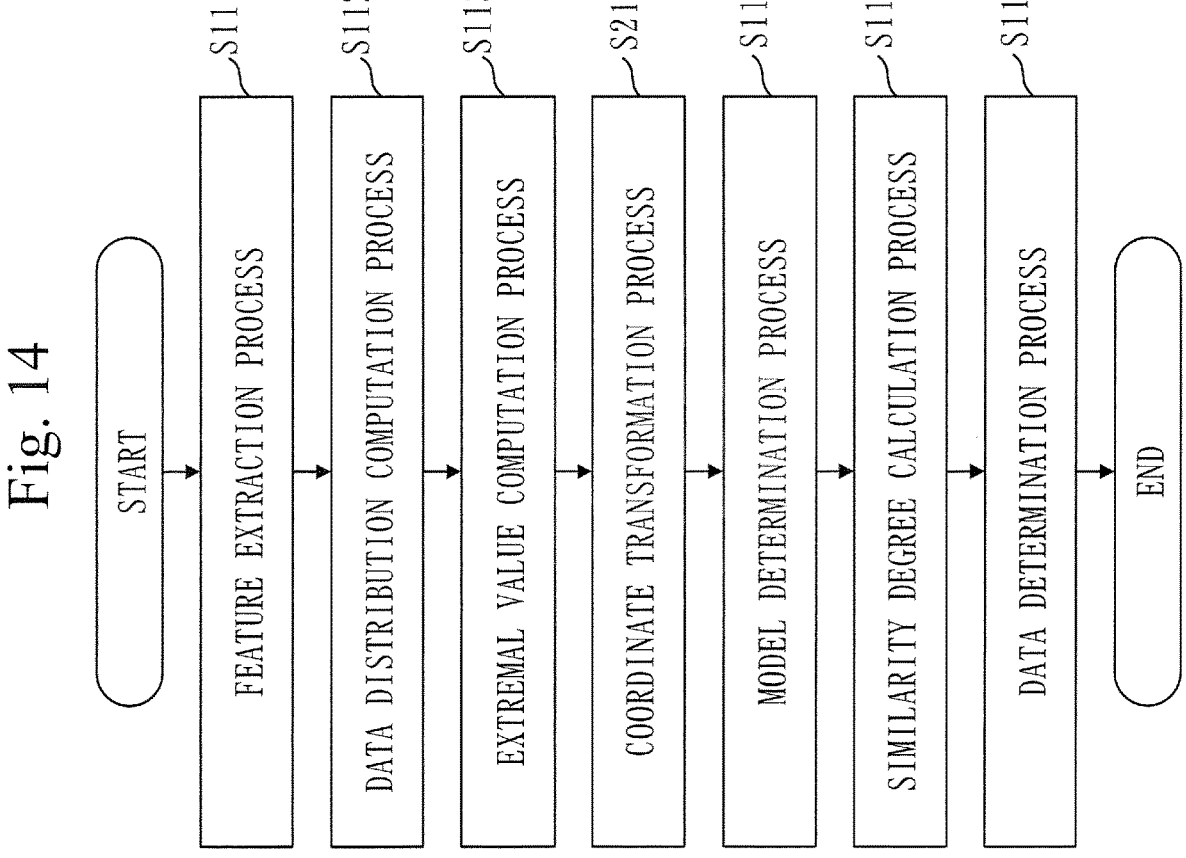
FIG. 14 is a flowchart illustrating operations concerning an inference phase of the similarity degree calculation device 1 according to Embodiment 2.

FIG. 14 is a flowchart illustrating an example of operations of the similarity degree calculation device 1 in an inference phase. The inference phase will be described with referring to FIG. 12 and FIG. 14.

(Step S211: Coordinate Transformation Process)

The coordinate transformation unit 21 receives the extremal value data 103T as input, generates the transformation extremal value data 107T with using the received extremal value data 103T, and outputs the generated transformation extremal value data 107T.

(Step S114: Model Determination Process)

A process of step S114 is a process equivalent to the model determination process in the inference phase of Embodiment 1 but the extremal value data 103T of Embodiment 1 is replaced by the transformation extremal value data 107T.

Description of Effect of Embodiment 2

As described above, in a specific example, the similarity degree calculation device 1 according to the present embodiment transforms the coordinate system of the extremal values by introducing, to each extremal value of the feature data distribution 102, a parameter z expressing which one of a maximal value and a minimal value that extremal value is, so as to separate a set of maximal values and a set of minimal values at a distance. Therefore, with the similarity degree calculation device 1 according to the present embodiment, a risk that a maximal value of a transfer destination and a minimal value of a transfer source are matched incorrectly, or a risk that a minimal value of a transfer destination and a maximal value of a transfer source are matched incorrectly, is decreased.

Hence, with the similarity degree calculation device 1 according to the present embodiment, a more accurate similarity degree can be found than with the similarity degree calculation device 1 according to Embodiment 1.

Other Configurations

Modification 4

Each coordinate pair of the transformation coordinate group $C^s$ may have a format in which each of $x_i^s$ and $y_i^s$ is multiplied by $z_i$, as indicated by [Formula 6].

$$\left\{ (z_i \cdot x_i^s, z_i \cdot y_i^s, z_i) \in \mathbb{R}^3 \middle| \begin{array}{c} |\{(x_i^s, y_i^s)\}| = n, i = 1, \ldots, n, s \in S, \\ z_i \in \{+1, -1\}, \\ z_i = \begin{cases} +1, & (x_i^s, y_i^s) \text{ is maximal} \\ -1, & (x_i^s, y_i^s) \text{ is minimal} \end{cases} \end{array} \right\} \quad \text{[Formula 6]}$$

19 20

It is guaranteed that even when the coordinate system is transformed as in [Formula 5], a maximal value and a minimal value are arranged at a distance of at least 2 from each other in the Euclidean distance in a three-dimensional Euclidean space coordinate system ($R^3$).

In the present modification, each of x and y is multiplied by z so that the maximal value and the minimal value are more likely to be arranged at a larger distance from each other. When a maximal value ($x_i^s$, $y_i^s$) and a minimal value ($x_j^s$, $y_j^s$) are given, a distance between them after transformation of the coordinate system is as indicated by [Formula 7].

$$\sqrt{\left(x_i^s - \left(-x_j^s\right)\right)^2 + \left(y_i^s - \left(-y_j^s\right)\right)^2 + \left(+1 - \left(-1\right)\right)^2} = \qquad \text{[Formula 7]}$$
$$\sqrt{\left(x_i^s + x_j^s\right)^2 + \left(y_i^s + y_j^s\right)^2 + 4}$$

Now [Formula 7] will be considered. If a variable x of the feature data distribution 102 is normalized by [0, 1], x≥0 is satisfied. Since y is a histogram, y≥0 is satisfied. Thus, $x_i^s - x_j^s < x_i^s + x_j^s$ and $y_i^s - y_j^s < y_i^s + y_j^s$ is established. Hence, if the maximal value and the minimal value are separated even a little, it is guaranteed that the maximal value and minimal value after transformation are more likely to be separated from each other by at least 2.

Hence, when an algorithm such as a support vector machine (SVM) is employed for inference, a maximal value and a minimal value are more likely to be discriminated from each other by a separating hyperplane.

Therefore, according to the present modification, it is possible to lower a probability that a minimal value of the feature data distribution 102S is incorrectly inferred when a maximal value of the feature data distribution 102T is inputted, and a probability that a maximal value of the feature data distribution 102S is incorrectly inferred when a minimal value of the feature data distribution 102T is inputted.

Embodiment 3

A description will be made mainly below regarding differences from the embodiment described above, with referring to drawings.

A major difference between Embodiment 1 and the present embodiment resides in that a model creation unit 16 uses datasets 105 each corresponding to an individual number of extremal values within an allowable range in order to enlarge a range of transfer source data candidates 2 for which similarity degrees are to be calculated. The relevant allowable range is also called a dataset allowable range. The dataset allowable range indicates a range around the number of transfer source extremal values corresponding to the individual dataset 105.

FIG. 15 illustrates specific examples of an image of how, when the model creation unit 16 creates a model, the model creation unit 16 selects datasets 105 each corresponding to the individual number of extremal values within the allowable range. The model creation unit 16 selects a dataset 105 by using, as a reference, the number of extremal values corresponding to that dataset 105. For the sake of descriptive convenience, FIG. 15 illustrates how a learning model is determined on a basis of a feature data distribution 102. Actually, however, the learning model is determined on a basis of extremal value data 103T corresponding to a feature data distribution 102T and a dataset 105 corresponding to the individual feature data distribution 102S.

Referring to FIG. 15, a number of extremal values of a transfer destination data distribution D1 is 4, a number of extremal values of a transfer source data distribution D2 is 3, and a number of extremal values of a transfer source data distribution D3 is 5. Note that (a) illustrates an image of how the model creation unit 16 selects a dataset 105 without considering the allowable range. In (a), there is no transfer source data distribution having the same number of extremal values as the number of extremal values of the transfer destination data distribution D1. Hence, the model creation unit 16 cannot select a dataset 105. On the other hand, (b) illustrates an image of how the model creation unit 16 selects a dataset 105 with considering the allowable range. The model creation unit 16 allows the number of extremal values within a range of ±1. Both the number of extremal values of the transfer source data distribution D2 and the number of extremal values in the transfer source data distribution D3 fall within a range of the number of extremal values of the transfer destination data distribution D1±1. Hence, the model creation unit 16 selects a dataset 105 corresponding to the individual transfer source data distribution D2 and the individual transfer source data distribution D3.

Description of Configuration

Figure 16:
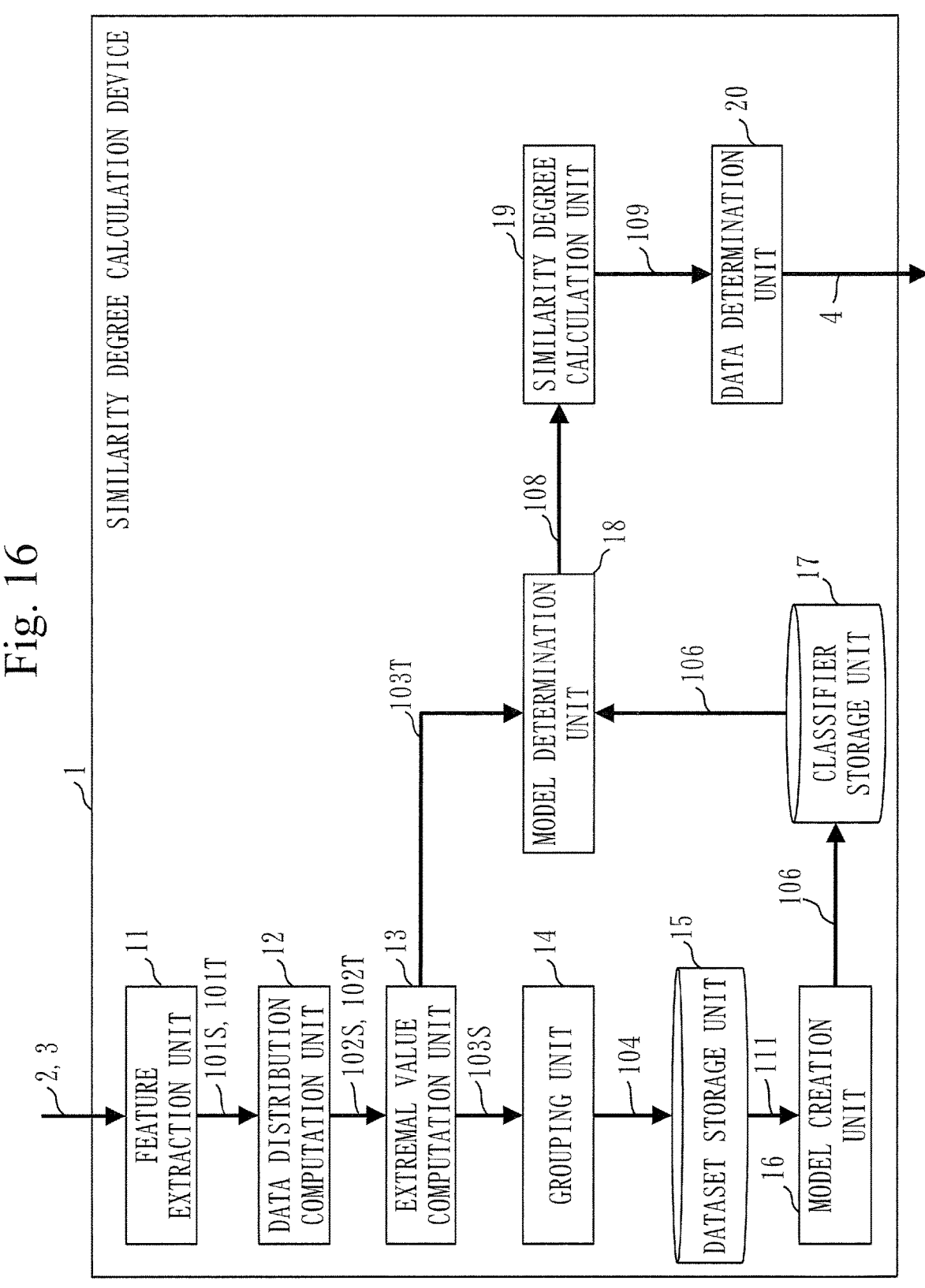
FIG. 16 is a configuration example of the similarity degree calculation device 1 according to Embodiment 3.

FIG. 16 illustrates a configuration example of a similarity degree calculation device 1 according to the present embodiment. A major difference between the similarity degree calculation device 1 according to the present embodiment and the similarity degree calculation device 1 according to Embodiment 1 resides in that the model creation unit 16 receives a dataset group 111 instead of the datasets 105. The dataset group 111 is a set consisting of a plurality of datasets 105. The model creation unit 16 may receive a plurality of datasets 105, and generate a dataset group 111 with using the received plurality of dataset 105.

A specific example of the dataset group 111 is a dataset group 111-($n\pm$b). The dataset group 111-($n\pm$b) is a set consisting of datasets 105 each corresponding to the individual number of extremal values within the range of n−b to n+b. Note that b is a parameter corresponding to the allowable range and satisfies b≥0 and b∈Z. A dataset 105 corresponding to a number of extremal values that count any one extremal value or more within the range of n−b to n+b is not always necessary.

[Formula 8] indicates a specific example of the dataset group 111-($n\pm$b). The meanings of the symbols are the same as those in [Formula 2]. Note that the dataset group 111-($n\pm$b) is expressed as a set $g_{n\pm b}$.

The dataset group 111 includes transfer source extremal values each corresponding to the individual number of extremal values within the dataset allowable range, and is also a subordinate concept of the dataset 105. In the dataset group 111-($n\pm$b), the number of transfer source extremal values which corresponds to the dataset 105 is n, and the dataset allowable range is n−b to n+b.

$$g_{n\pm b} = \{((x_i^s, y_i^s), c^s) | n - b \leq |\{(x_i^s, y_i^s)\}| \leq n + b, \qquad \text{[Formula 8]}$$
$$i = 1, \dots, n, s \in S, b \geq 0, b \in \mathbb{Z}\}$$

The model creation unit 16 acquires the dataset group 111, in place of a dataset 105-$n$, from a dataset storage unit 15, and creates a classifier 106 with using the acquired dataset group 111. In a specific example, the model creation unit 16 creates a classifier 106-$n$ with using the dataset group 111-($n\pm$b).

Description of Operations

A flowchart illustrating operations of the similarity degree calculation device 1 according to the present embodiment is the same as the flowchart illustrating the operations of the similarity degree calculation device 1 according to Embodiment 1. A description will be made below mainly regarding differences from the operations of the similarity degree calculation device 1 according to Embodiment 1.

<Learning Phase>

(Step S105: Model Creation Process) The present process is a process equivalent to the model creation process of Embodiment 1 in the learning phase but the dataset 105 of Embodiment 1 is replaced by the dataset group 111-($n\pm$b). That is, the model creation unit 16 employs the dataset group 111-($n\pm$b) when creating the classifier 106-$n$.

Subsequent processes are the same as those in Embodiment 1. Note that the model creation unit 16 saves a learning model learned by using the dataset group 111-($n\pm$b), to a classifier storage unit 17 as the classifier 106-$n$.

When the training set is the dataset group 111-($n\pm$b), the same extremal value coordinate group $G^s\{(x_i^{s1}, y_i^{s1})\}$ (provided that $|(x_i^{s1}, y_i^{s1})|=n$, $i=1, \ldots, n$, $s1\in S$) is used in learning of the classifiers 106-($n$–b) through 106-($n$+b). Therefore, when the similarity degree between $\{(x_i^{s1}, y_i^{s1})\}$ and $\{(x_i^t, y_i^t)\}$ is high, a class membership probability which corresponds to $\{(x_i^t, y_i^t)\}$ and which is for a class corresponding to s1 is high in any classifier 106 created with using $\{(x_i^{s1}, y_i^{s1})\}$. As a result, when a class corresponding s1 is determined as $c_1$, a value of the similarity degree score($c_1$) becomes high. For this reason, it is assumed that even if an allowable range is set for a number of extremal values which is a reference for selecting training data to be used for learning the learning model, the extremal values of the transfer destination data 3 can be classified appropriately.

Description of Effect of Embodiment 3

As described above, the similarity degree calculation device 1 according to the present embodiment sets a dataset allowable range for the number of extremal values being a reference for selecting training data to be used for learning a learning model employed for calculating a similarity degree. In a specific example, the similarity degree calculation device 1, by introducing a parameter b, enlarges a candidate range of the transfer source data candidates 2 for which similarity degrees are to be calculated.

For this reason, when the feature data distribution 102S and the feature data distribution 102T which, although their numbers of extremal values are different, are globally similar to each other, the similarity degree calculation device 1 is able to judge the similarity between these two data distributions.

Figure 17:
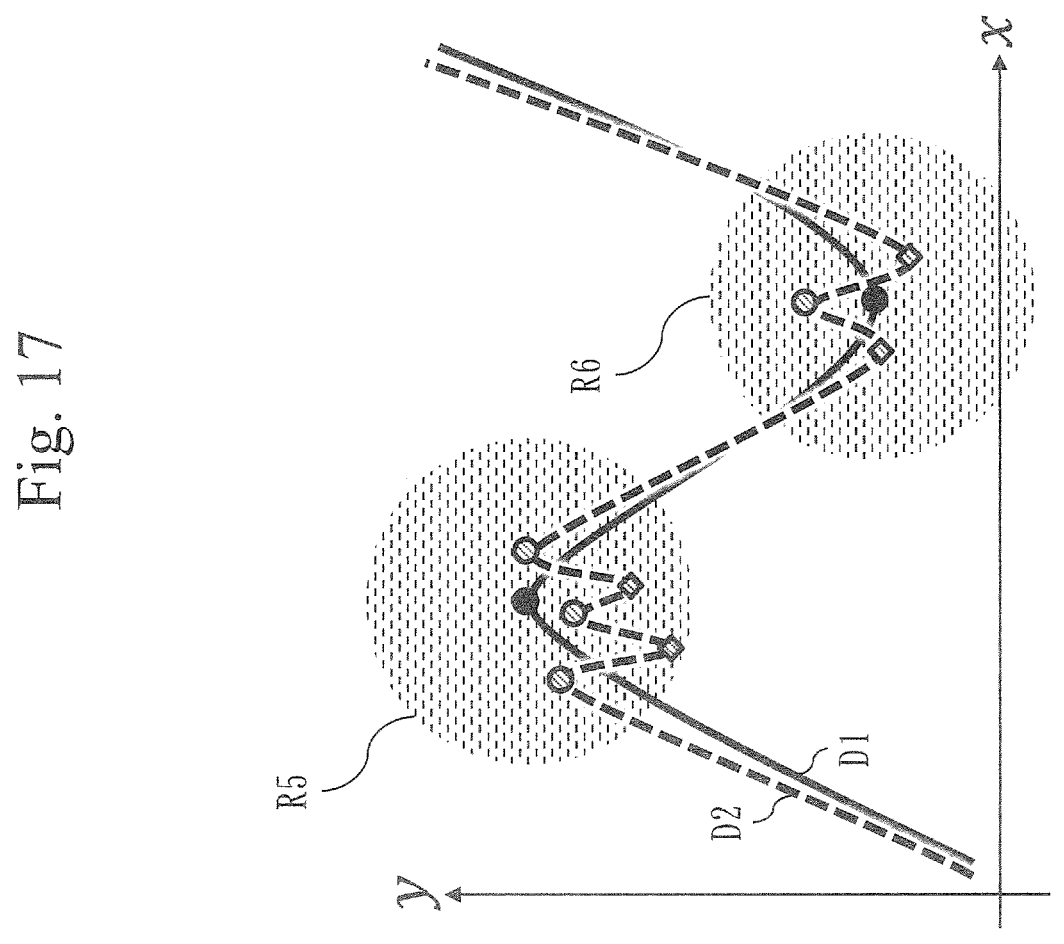

FIG. 17 is a diagram specifically explaining operations of the similarity degree calculation device 1 when the feature data distribution 102S and the feature data distribution 102T are globally similar to each other. In FIG. 17, the number of extremal values of the transfer destination data distribution D1 and the number of extremal values of the transfer source data distribution D2 are different. However, no matter what the value of x may be, the values of y which correspond to the value x are close to each other in both of the two data distributions. That is, the two data distributions are globally similar. Also, a neighboring region R5 and a neighboring region R6 are regions that are close to extremal values of the transfer destination data distribution D1. In the two regions, an extremal value of the transfer destination data distribution D1 and an extremal value of the transfer source data distribution D2 are close.

As the number of extremal values of the transfer source data distribution D2 which are located near the extremal values of the transfer destination data distribution D1 is larger, the similarity degree calculation device 1 classifies classes corresponding to the transfer destination data distribution D1, to classes corresponding to the transfer source data distribution D2, with a higher probability.

Also, the similarity degree calculation device 1 can control a degree of similarity with using a parameter b. In a specific example, as the value of the parameter b is smaller, the operations of the similarity degree calculation device 1 are closer to those in exact match search. As the value of the parameter b is larger, the operations of the similarity degree calculation device 1 are closer to those in fuzzy search.

Other Configurations

Modification 5

The dataset allowable range need not be symmetric. In a specific example, the model creation unit 16 employs, as the dataset group 111 to be employed when generating the classifier 106-$n$, a dataset group 111-$k$ (k=n, n+1, $\ldots$, n+b) instead of a dataset group 111-($n\pm$b). The dataset group 111-$k$ (k=n, n+1, $\ldots$, n+b) is a dataset 105 corresponding to the number of extremal values within a range of n to n+b.

Modification 6

The dataset allowable range may be set dynamically.

In a specific example of the present modification, a case will be considered where, when only a dataset 105-1, a dataset 105-3, and a dataset 105-4 are found as datasets 105, a dataset group 111 corresponding to the individual datasets 105 is to be generated by selecting datasets 105, one dataset 105 on one side which is the closest to the individual dataset 105, and one dataset 105 on the other side which is the closest to that individual dataset 105. In this case, when the dataset 105-3 is the reference, the dataset 105-1 and the dataset 105-4 are selected as the closest datasets 105. In this manner, a model creation unit 16 may select a dataset 105 with taking into consideration whether there is a dataset 105 corresponding to each number of extremal values, thereby generate the dataset group 111.

Embodiment 4

A description will be made below mainly regarding differences from the embodiment described above, with referring to drawings.

A major difference between Embodiment 1 and the present embodiment resides in that a model determination unit 18 uses classifiers 106 each corresponding to an individual number of extremal values within an allowable range in order to enlarge a range of transfer source data candidates 2 for which similarity degrees are to be calculated. The relevant allowable range is also called a model allowable range. The model allowable range indicates a range around the number of transfer destination external values included in a transfer destination extremal value group.

Figure 18:
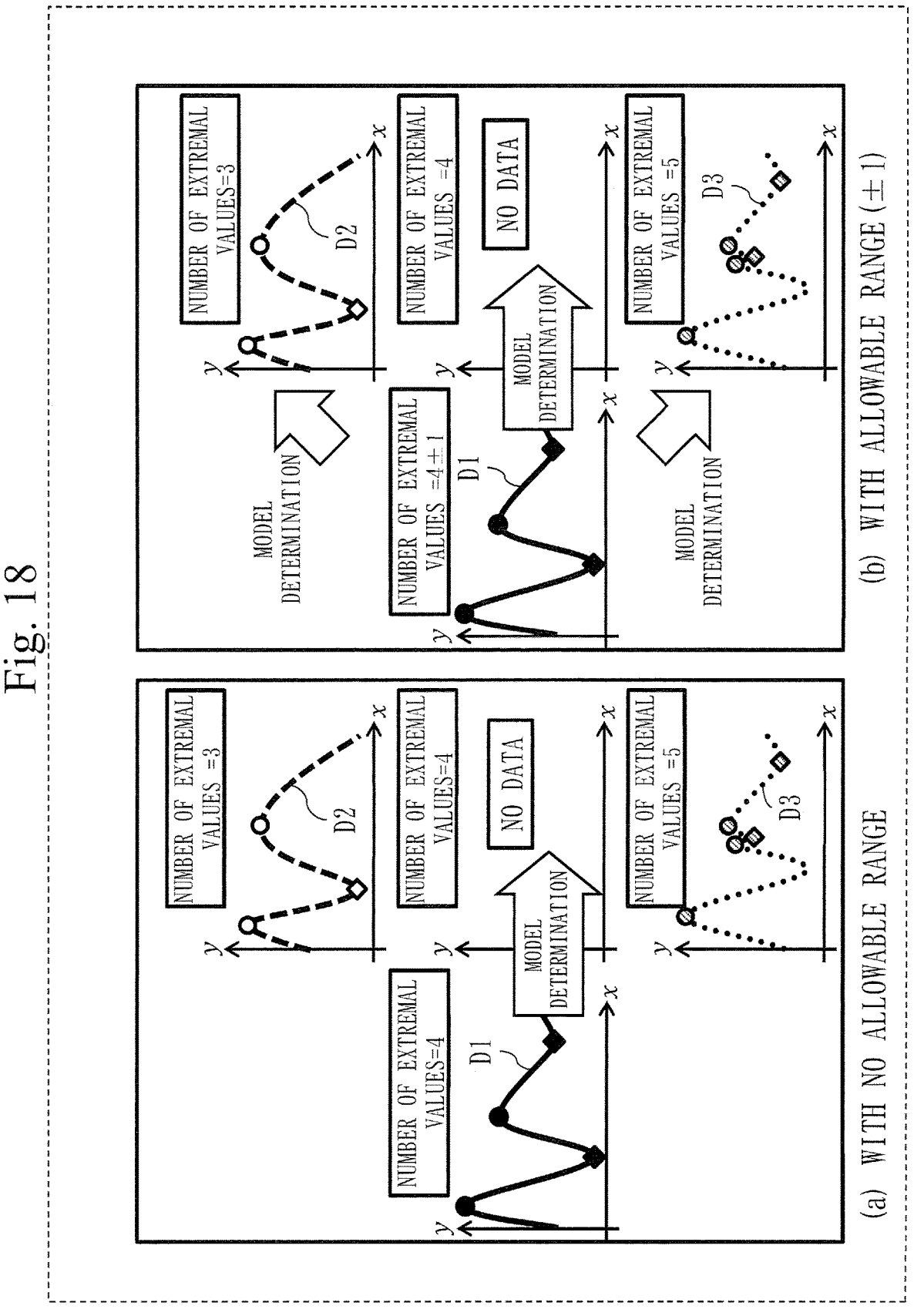
FIG. 18 includes diagrams explaining an overview of operations of a similarity degree calculation device 1 according to Embodiment 4, in which: (a) is a diagram explaining a case with no allowable range; and (b) is a diagram explaining a case with an allowable range.

FIG. 18 illustrates specific examples of an image of how a model creation unit 16 selects a classifier 106 corresponding to a number of extremal values within the allowable range. FIG. 18 can be grasped in the same manner as FIG. 15. The model creation unit 16 selects at least one classifier 106 with using a certain number of extremal values as a reference.

Referring to FIG. 18, (a) illustrates an image of how the model determination unit 18 selects a classifier 106 without considering the allowable range. In (a), there is no classifier 106 corresponding to the same number of extremal values as the number of extremal values of a transfer destination data distribution D1. Hence, the model determination unit 18 cannot select a classifier 106. On the other hand, (b) illustrates an image of how the model determination unit 18 selects a classifier 106 with considering an allowable range. In (b), the allowable range is 3 or more to 5 or less, and a number of extremal values of a transfer source data distribution D2 and a number of extremal values of a transfer source data distribution D3 fall within the allowable range. Hence, the model creation unit 16 selects a classifier 106-3 and a classifier 106-5, and generates, as a classifier group 112 corresponding to a feature data distribution 102-3, a classifier group 112 consisting of the classifier 106-3, a classifier 106-4, and the classifier 106-5.

Description of Configuration

Figure 19:
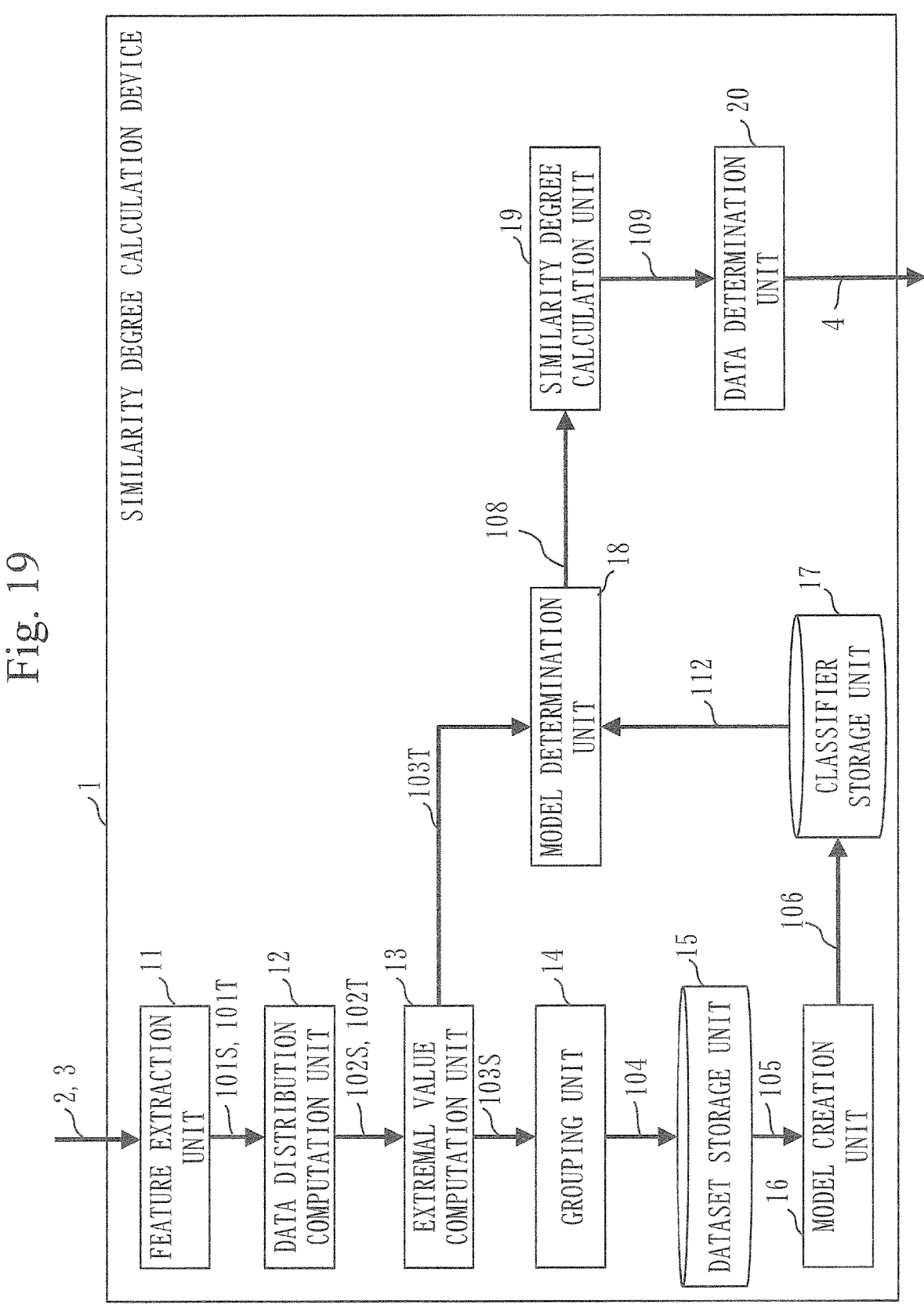
FIG. 19 is a configuration example of the similarity degree calculation device 1 according to Embodiment 4.

FIG. 19 illustrates a configuration example of the similarity degree calculation device 1 according to the present embodiment. A major difference of the similarity degree calculation device 1 according to the present embodiment from the similarity degree calculation device 1 according to Embodiment 1 resides in that the model determination unit 18 outputs the classifier group 112 in place of a classifier 106-*m*.

A specific example of the classifier group 112 is a classifier group 112-($m\pm$d). Note that d is a parameter corresponding to the allowable range and satisfies d $0$ and d$\in$Z. The classifier group 112-($m\pm$d) is a set consisting of classifiers 106 which are classifiers 106-($m$−d) to 106-($m$+d). Classifiers 106 corresponding to one or more numbers of extremal values, each of the one or more numbers of extremal values being within a range of m−d to m+d, are not always necessary.

The model determination unit 18 generates a classifier group 112 corresponding to an extremal value coordinate group G$^t$ in place of a classifier 106 corresponding to the extremal value coordinate group G$^t$, and generates, as inference data 108, data including the extremal value coordinate group G$^t$ and the classifier group 112 corresponding to the extremal value coordinate group G$^t$.

The model determination unit 18 determines, as a determination model, a learning model group consisting of learning models each corresponding to an individual number of transfer source extremal values within the model allowable range.

A similarity degree calculation unit 19 finds a similarity degree between each of at least one feature data distribution 102S and a feature data distribution 102T, with using, in place of the classifier 106, individual classifiers 106 included in the classifier group 112.

Description of Operations

A flowchart illustrating operations of the similarity degree calculation device 1 according to the present embodiment is the same as the flowchart illustrating the operations of the similarity degree calculation device 1 according to Embodiment 1. A description will now be made below mainly regarding differences from the operations of the similarity degree calculation device 1 according to Embodiment 1.

<Inference Phase>

(Step S114: Model Determination Process)

This process is a process equivalent to the model determination process of Embodiment 1 in the inference phase but the classifier 106-*m* of Embodiment 1 is replaced by the classifier group 112-($m\pm$d). That is, the model determination unit 18 identifies the classifier group 112-($m\pm$d) instead of the classifier 106-*m*, and outputs the inference data 108 including the identified classifier group 112-($m\pm$d) and the extremal value coordinate group G$^t$.

(Step S115: Similarity Degree Calculation Process)

The similarity degree calculation unit 19 calculates the similarity degree with using the classifier group 112-($m\pm$d) instead of the classifier 106-*m*.

A similarity degree calculation process in a case where the present embodiment and Embodiment 3 are combined will be specifically described below. Considering a possibility that a class membership probability may appear in the classifier 106 in an overlapping manner, the similarity degree calculation unit 19 changes the method of calculating the similarity degree score(c$_j$). A similarity degree subscore score$_k$(c$_j$) with respect to a label c$_j$ of the feature data distribution 102T, in a case of using the classifier 106-*k* (k=m−d, m−d+1, . . . , m+d), is defined as in [Formula 9]. The meanings of the symbols of [Formula 9] are the same as those in [Formula 4].

$$\text{score}_k(c_j) = \sum_{i=1}^{k}\left(w_i \cdot p_{c_j}^i\right) \qquad \text{[Formula 9]}$$

If a plurality of classifiers 106-*k* can be classified under the same label, concerning each of the relevant plurality of classifiers 106-*k*, the closer the value of k is to the number of extremal values corresponding to the relevant label, the more the similarity degree calculation unit 19 considers that classifier 106-*k* important. That is, the closer the value of k of a subscore is to the relevant number of extremal values, the more the similarity degree calculation unit 19 considers that subscore important when calculating the similarity degree.

[Formula 10] shows a specific example of the similarity decree score(c$_j$). Here, in the upper part of the right side of Formula 10, k is a variable that identifies one classifier 106 which the similarity degree calculation unit 19 considers the most important among the classifiers 106 that can be classified under the label c$_j$. Note that k' expresses a value other than k, and is a variable that identifies a classifier 106 that can be classified under the label c$_j$. When except the classifier 106-*k*, there are a plurality of classifiers 106 that can be classified under the label c$_j$, k' is formed of a plurality of values. In a specific example, fp(d) is a function that becomes maximum when d=0 and returns a value inversely proportional to d. A specific example is fp(d)=1/(1+d)$^2$ where d is a variable expressing a distance from a number of extremal values which corresponds to the label c$_j$, to each element of k'. When k' is formed of a plurality of values, fp(d) is prepared for each element of k'.

Assume a specific example where the number of extremal values which corresponds to the label c$_j$ is m and that any of the classifiers 106-*k* (k=m−d, m−d+1, . . . , m+d) can be classified under the label $c_j$. In this case, k=m and k'={m−d, . . . , m−1, m+1, . . . , m+d}. That is, $score_k(c_j)$ is a similarity degree found with using the classifier 106-*m*, and $score_k(c_j)$ is a value which was found with using a similarity degree found with using a classifier 106 other than the classifier 106-*m*.

$$score(c_j) = \begin{cases} score_k(c_j) + fp(d) \cdot score_{k'}(c_j), & (score_k(c_j) = score_{k'}(c_j)) \\ score_k(c_j), & (\text{otherwise}) \end{cases}$$

[Formula 10]

Description of Effect of Embodiment 4

As described above, the similarity degree calculation device 1 according to the present embodiment sets a model allowable range for the number of extremal values which is a reference for selecting a learning model to be used for calculation of the similarity degree. In a specific example, the similarity degree calculation device 1 enlarges a range of the transfer source data candidates 2 for which similarity degrees are to be calculated, by introducing the parameter d.

For this reason, in a case as illustrated in FIG. 17, the similarity degree calculation device 1 can judge a similarity degree between two data distributions in the same manner as the similarity degree calculation device 1 according to Embodiment 3 does.

Also, the similarity degree calculation device 1 can control a degree of similarity with using the parameter d. In a specific example, as the value of the parameter d is smaller, the operations of the similarity degree calculation device 1 are closer to those in exact match search. As the value of the parameter d is larger, the operations of the similarity degree calculation device 1 are closer to those in fuzzy search.

Other Configurations

Modification 7

The model allowable range need not be symmetric. In a specific example, the model determination unit 18 may determine, as a classifier group 112 corresponding to the feature data distribution 102T whose number of extremal values is m, classifier group 112-*k* (k=m, m+1, . . . , m+d) instead of the classifier group 112-(*m*±d). The classifier group 112-*k* (k=m, m+1, . . . , m+d) is a classifier group 112 consisting of classifiers 106 corresponding to the number of extremal values within a range of m to m+d.

Modification 8

The model allowable range may be set dynamically.

In a specific example of the present modification, a case will be considered where, when only a dataset 105-1, a dataset 105-3, and a dataset 105-4 are found as datasets 105, classifiers 106 each corresponding to the individual dataset 105, a classifier 106 corresponding to one dataset 105 on one side which is the closest to the individual dataset 105, and a classifier 106 corresponding to one dataset 105 on the other side which is the closest to that individual dataset 105 are to be selected as the classifier group 112. In this case, when 3 is the reference for the number of extremal values, the classifier 106-1, the classifier 106-3, and the classifier 106-4 are selected. In this manner, a model determination unit 18 may select the classifiers 106 by taking into consideration whether there is a classifier 106 corresponding to each number of extremal values.

Other Embodiments

It is possible to combine the embodiments described above freely, to modify an arbitrary constituent element of each embodiment, or to omit an arbitrary constituent element in each embodiment.

Embodiments are not limited to those described as Embodiments 1 to 4, but the embodiments may be changed in various manners as necessary. Procedures described with using the flowcharts or the like may be changed appropriately.

REFERENCE SIGNS LIST

1: similarity degree calculation device; 2: transfer source data candidate; 3: transfer destination data; 4: determination data; 11: feature extraction unit; 12: data distribution computation unit; 13: extremal value computation unit; 14: grouping unit; 15: dataset storage unit; 16: model creation unit; 17: classifier storage unit; 18: model determination unit; 19: similarity degree calculation unit; 20: data determination unit; 21: coordinate transformation unit; 51: processor; 52: memory; 53: auxiliary storage device; 54: input/output IF; 55: communication device; 58: processing circuit; 59: signal line; 101, 101S, 101T: feature vector; 102, 102S, 102T: feature data distribution; 103S, 103T: extremal value data; 104: learning data; 105: dataset; 106: classifier; 107S, 107T: transformation extremal value data; 108: inference data; 109: similarity degree data; 111: dataset group; 112: classifier group; D1: transfer destination data distribution; D2, D3: transfer source data distribution; R1, R2, R3, R4, R5, R6: neighboring region.

The invention claimed is:

1. A similarity degree calculation device which performs transfer learning with using a transfer source data candidate and transfer destination data, comprising:

processing circuitry to find a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, wherein the transfer source data candidate includes at least one transfer source data candidate, the transfer source data distribution includes at least one transfer source data distribution, the transfer source extremal value group includes at least one transfer source extremal value group, the transfer source data candidate corresponds to the transfer source data distribution by one-to-one correspondence, and the transfer source data distribution corresponds to the transfer source extremal value group by one-to-one correspondence, wherein the processing circuitry finds a similarity degree between each transfer source data distribution and the transfer destination data distribution on a basis of each transfer source extremal value group corresponding to said each transfer source data distribution, and on a basis of the transfer destination extremal value group, and wherein said each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, wherein the processing circuitry further creates and stores in a storage a learning model which is a model corresponding to each dataset and used for estimating an identifier corresponding to a given coordinate group, determines, from the learning model, a learning model as a determination model according to a number of transfer destination extremal values included in the transfer destination extremal value group, and finds the similarity degree with using the determination model and the transfer destination extremal value group.

2. The similarity degree calculation device according to claim 1, wherein said each dataset includes transfer source extremal values corresponding to the number of transfer source extremal values corresponding to said each dataset.

3. The similarity degree calculation device according to claim 1, wherein said each dataset is a dataset group including transfer source extremal values each corresponding to an individual number of extremal values within a dataset allowable range indicating a range around the number of transfer source extremal values corresponding to said each dataset.

4. The similarity degree calculation device according to claim 1, wherein the processing circuitry determines, as a determination model, a learning model group consisting of learning models each corresponding to an individual number of transfer source extremal values within a model allowable range indicating a range around the number of transfer destination extremal values included in the transfer destination extremal value group.

5. The similarity degree calculation device according to claim 1, wherein the processing circuitry further finds, as the transfer source extremal value, a coordinate obtained by projecting a pre-transformation transfer source extremal value which is an extremal value of the transfer source data distribution, to a space having a higher dimension than a dimension of the pre-transformation transfer source extremal value, and finds, as the transfer destination extremal value, a coordinate obtained by projecting a pre-transformation transfer destination extremal value which is an extremal value of the transfer destination data distribution, to a space having a higher dimension than a dimension of the pre-transformation transfer destination extremal value.

6. A similarity degree calculation device which performs transfer learning with using a transfer source data candidate and transfer destination data, comprising:

processing circuitry to find a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, to find, as the transfer source extremal value, a coordinate obtained by projecting a pre-transformation transfer source extremal value which is an extremal value of the transfer source data distribution, to a space having a higher dimension than a dimension of the pre-transformation transfer source extremal value, and to find, as the transfer destination extremal value, a coordinate obtained by projecting a pre-transformation transfer destination extremal value which is an extremal value of the transfer destination data distribution, to a space having a higher dimension than a dimension of the pre-transformation transfer destination extremal value, wherein each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, wherein the processing circuitry further creates and stores in a storage a learning model which is a model corresponding to each dataset and used for estimating an identifier corresponding to a given coordinate group.

7. The similarity degree calculation device according to claim 1, wherein the processing circuitry further determines a transfer source data candidate corresponding to a similarity degree that satisfies a determination condition, as transfer source data.

8. The similarity degree calculation device according to claim 6, wherein the processing circuitry further determines a transfer source data candidate corresponding to a similarity degree that satisfies a determination condition, as transfer source data.

9. The similarity degree calculation device according to claim 1, wherein the processing circuitry further receives the transfer source data distribution and the transfer destination data distribution, finds an extremal value of the transfer source data distribution with using the transfer source data distribution, and finds an extremal value of the transfer destination data distribution with using the transfer destination data distribution.

10. The similarity degree calculation device according to claim 6, wherein the processing circuitry further receives the transfer source data distribution and the transfer destination data distribution, finds an extremal value of the transfer source data distribution with using the transfer source data distribution, and finds an extremal value of the transfer destination data distribution with using the transfer destination data distribution.

11. A similarity degree calculation method which performs transfer learning with using a transfer source data candidate and transfer destination data, the similarity degree calculation method comprising finding a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, wherein the transfer source data candidate includes at least one transfer source data candidate, the transfer source data distribution includes at least one transfer source data distribution, the transfer source extremal value group includes at least one transfer source extremal value group, the transfer source data candidate corresponds to the transfer source data distribution by one-to-one correspondence, and the transfer source data distribution corresponds to the transfer source extremal value group by one-to-one correspondence, the similarity degree calculation method comprising finding a similarity degree between each transfer source data distribution and the transfer destination data distribution on a basis of each transfer source extremal value group corresponding to said each transfer source data distribution, and on a basis of the transfer destination extremal value group, wherein said each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, the similarity degree calculation method comprising creating and storing in a storage a learning model which is a model corresponding to each dataset and used for estimating an identifier corresponding to a given coordinate group, determining, from the learning model, a learning model as a determination model according to a number of transfer destination extremal values included in the transfer destination extremal value group, and finding the similarity degree with using the determination model and the transfer destination extremal value group.

12. A similarity degree calculation method which performs transfer learning with using a transfer source data candidate and transfer destination data, the similarity degree calculation method comprising finding a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, finding, as the transfer source extremal value, a coordinate obtained by projecting a pre-transformation transfer source extremal value which is an extremal value of the transfer source data distribution, to a space having a higher dimension than a dimension of the pre-transformation transfer source extremal value, and finding, as the transfer destination extremal value, a coordinate obtained by projecting a pre-transformation transfer destination extremal value which is an extremal value of the transfer destination data distribution, to a space having a higher dimension than a dimension of the pre-transformation transfer destination extremal value, wherein each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, wherein the method further comprises creating and storing in a storage a learning model which is a model corresponding to each dataset and used for estimating an identifier corresponding to a given coordinate group.

13. A non-transitory computer-readable recording medium recorded with a similarity degree calculation program which causes a computer to perform transfer learning with using a transfer source data candidate and transfer destination data, the similarity degree calculation program causing the computer to find a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, wherein the transfer source data candidate includes at least one transfer source data candidate, the transfer source data distribution includes at least one transfer source data distribution, the transfer source extremal value group includes at least one transfer source extremal value group, the transfer source data candidate corresponds to the transfer source data distribution by one-to-one correspondence, and the transfer source data distribution corresponds to the transfer source extremal value group by one-to-one correspondence, the similarity degree calculation program causing the computer to find a similarity degree between each transfer source data distribution and the transfer destination data distribution on a basis of each transfer source extremal value group corresponding to said each transfer source data distribution, and on a basis of the transfer destination extremal value group, wherein said each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, the similarity degree calculation program causing the computer to create and store in a storage a learning model which is a model corresponding to each dataset and used for estimating an identifier corresponding to a given coordinate group, to determine, from the learning model, a learning model as a determination model according to a number of transfer destination extremal values included in the transfer destination extremal value group, and to find the similarity degree with using the determination model and the transfer destination extremal value group.

14. A non-transitory computer-readable recording medium recorded with a similarity degree calculation program which causes a computer to perform transfer learning with using a transfer source data candidate and transfer destination data, the similarity degree calculation program causing the computer to find a similarity degree between a transfer source data distribution and a transfer destination data distribution on a basis of a transfer source extremal value group and a transfer destination extremal value group, the transfer source extremal value group including a transfer source extremal value indicating an extremal value of the transfer source data distribution indicating a distribution of a feature amount of the transfer source data candidate, the transfer destination extremal value group including a transfer destination extremal value indicating an extremal value of the transfer destination data distribution indicating a distribution of a feature amount of the transfer destination data, to find, as the transfer source extremal value, a coordinate obtained by projecting a pre-transformation transfer source extremal value which is an extremal value of the transfer source data distribution, to a space having a higher dimension than a dimension of the pre-transformation transfer source extremal value, and to find, as the transfer destination extremal value, a coordinate obtained by projecting a pre-transformation transfer destination extremal value which is an extremal value of the transfer destination data distribution, to a space having a higher dimension than a dimension of the pre-transformation transfer destination extremal value, wherein each transfer source extremal value is associated with an identifier that identifies a transfer source data candidate corresponding to a transfer source data distribution having an extremal value corresponding to said each transfer source extremal value, and said each transfer source extremal value belongs to at least one dataset prepared per value expressed by a number of extremal values, according to a number of transfer source extremal values included in the transfer source extremal value group that includes the transfer source extremal values, wherein the similarity degree calculation program causing the computer to further create and store in a storage a learning model which is a model corresponding to each dataset and used for estimating an identifier corresponding to a given coordinate group.

* * * * *